United States Patent [19]
Morimoto et al.

[11] Patent Number: 6,148,303
[45] Date of Patent: Nov. 14, 2000

[54] REGRESSION TREE GENERATION METHOD AND APPARATUS THEREFOR

[75] Inventors: Yasuhiko Morimoto, Yamato; Hiromu Ishii, Tokyo-to; Shinichi Morishita, Yokohama, all of Japan

[73] Assignee: International Business Machines Corporation, Armonk, N.Y.

[21] Appl. No.: 09/054,037

[22] Filed: Apr. 2, 1998

[30] Foreign Application Priority Data

Jun. 18, 1997 [JP] Japan ................................ 9-161280

[51] Int. Cl.⁷ .............................................. G06F 17/30
[52] U.S. Cl. ........................................................ 707/102
[58] Field of Search .................................................. 707/102

[56] References Cited

U.S. PATENT DOCUMENTS

| | | | |
|---|---|---|---|
| 5,343,554 | 8/1994 | Koza et al. | 706/13 |
| 5,600,574 | 2/1997 | Reitan | 702/185 |
| 5,657,424 | 8/1997 | Farrell et al. | 704/255 |
| 5,864,839 | 1/1999 | Bourgoin | 707/1 |
| 5,949,678 | 9/1999 | Wold et al. | 700/83 |
| 5,982,934 | 11/1999 | Villalba | 382/226 |
| 5,983,251 | 11/1999 | Martens et al. | 708/203 |
| 6,002,865 | 12/1999 | Thomsen | 707/3 |

*Primary Examiner*—Wayne Amsbury
*Attorney, Agent, or Firm*—McGinn & Gibb; Stephen C. Kaufman, Esq.

[57] ABSTRACT

To generate a more preferable regression tree by using two predicative numeric attributes as a rule for splitting. For N×M buckets of a plane that has two axes corresponding to two predicative numeric attributes of data in a database, which belongs to one node of a regression tree, the number u(i, j) of data, belonging to a bucket (coordinate (i, j)), and sum v(i, j) of an objective numeric attribute value of data belonging to the bucket are stored. A bucket region which maximizes the interclass variance is segmented from the plane. Nodes are prepared for the data included in the extracted bucket region and for data outside the bucket region.

18 Claims, 18 Drawing Sheets

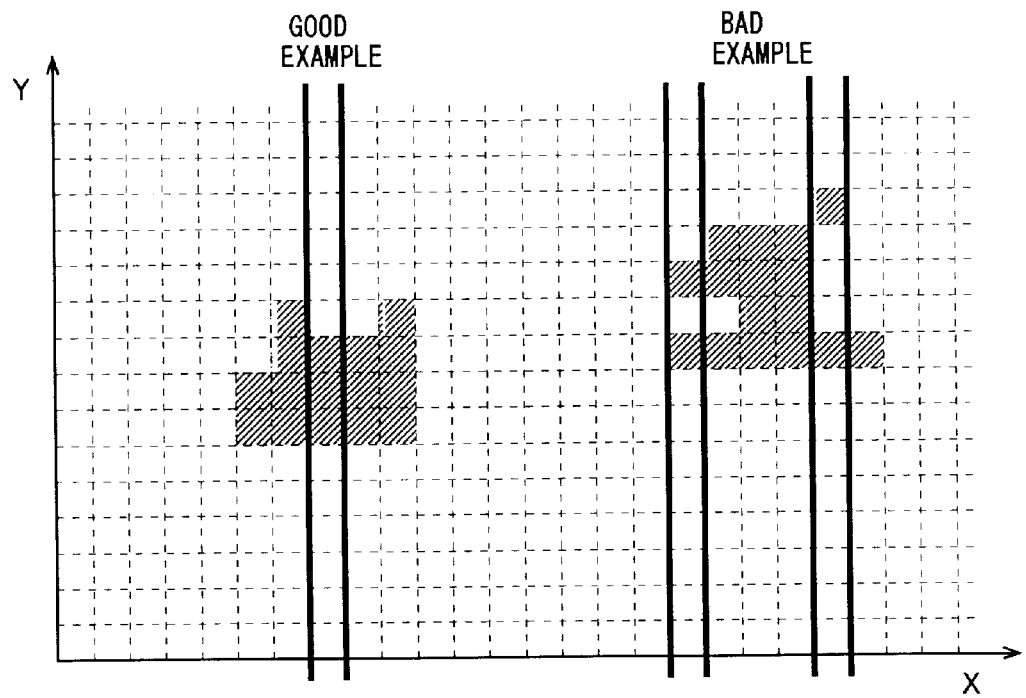
F I G. 1 2
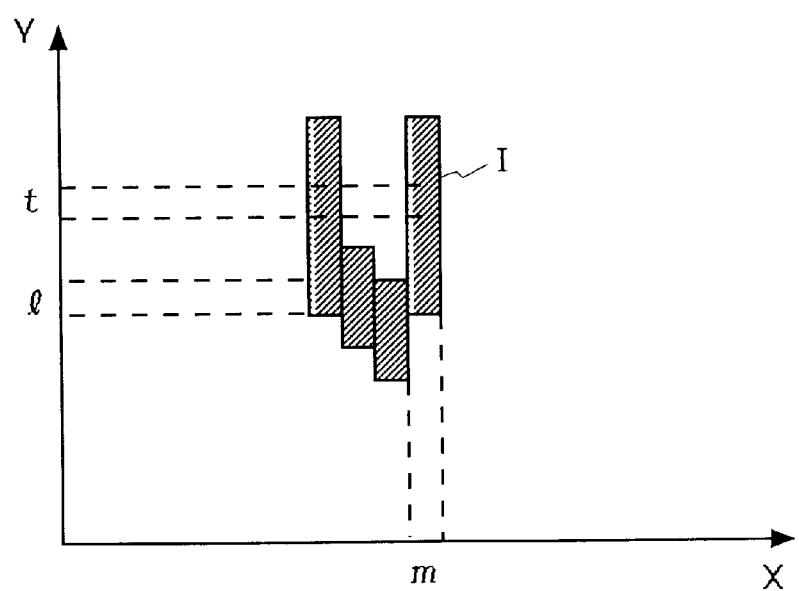
F I G. 1 3

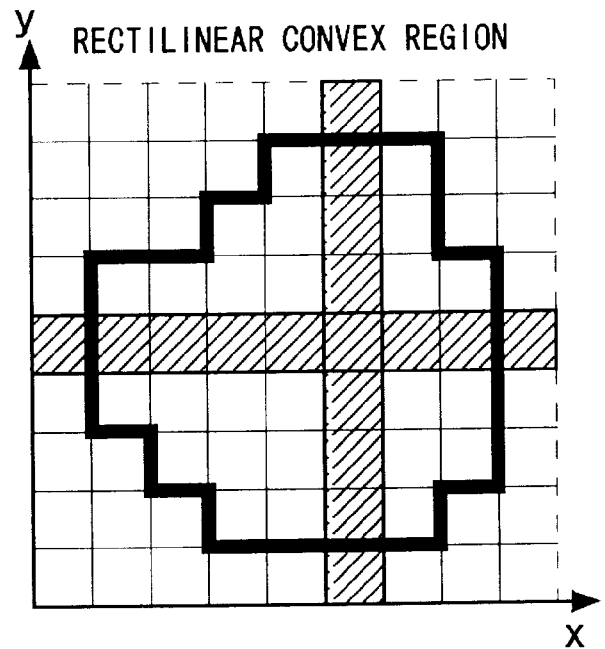
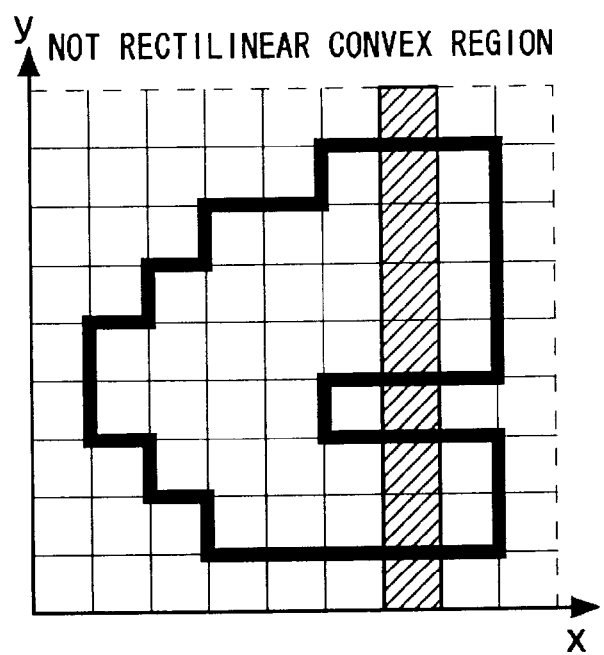
F I G. 1 6

```
for k=0 to N_y-1 do
        for s=0 to N_y-1-k do
                t=s+k
                CALCULATE f_m^W(s,t) USING EXPRESSION 31
        end
end
```

```
for t:=0 to N_y-1 do
        β^W=0
        β^U=0
        for s:=0 to t do
                if f_{m-1}^W(s,t) > f_{m-1}^W(β^W,t) then β^W=s
                if f_{m-1}^U(s,t) > f_{m-1}^U(β^U,t) then β^U=s
                β_{m-1}^W(s,t)=β^W
                β_{m-1}^U(s,t)=β^U
        end
end
```

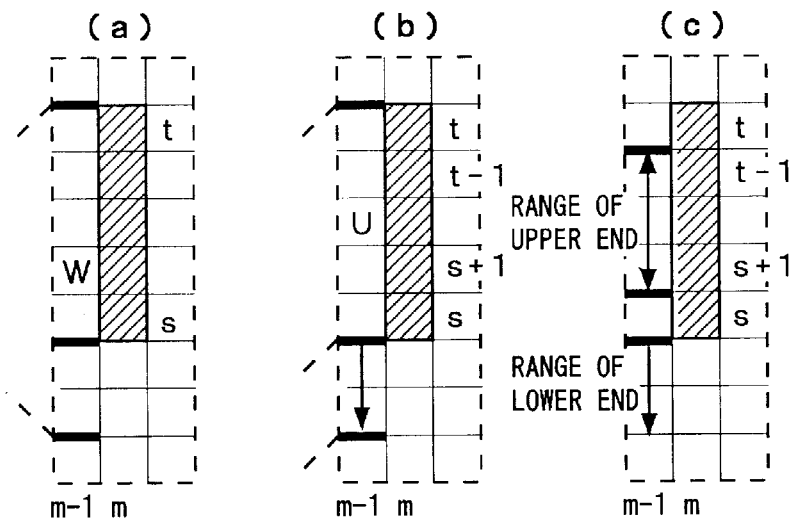
F I G. 2 3
```
for s=0 to N_y-1 do
    for t=s to N_y-1 do
        CALCULATE f_m^U(s,t) USING EXPRESSION 34
    end
end
```
F I G. 2 4
```
for t=N_y-1 to 0 do
    for s=t to 0 do
        CALCULATE f_m^D(s,t) USING EXPRESSION 37
    end
end
```
F I G. 2 5

```
for s:=N_y-1 to 0 do
    τ^W = N_y - 1
    τ^D = N_y - 1
    for t:=N_y-1 to s do
        if f^W_{m-1}(s, t) > f^W_{m-1}(s, τ^W) then τ^W=t
        if f^D_{m-1}(s, t) > f^D_{m-1}(s, τ^D) then τ^D=t
        τ^W_{m-1}(s, t) = τ^W
        τ^D_{m-1}(s, t) = τ^D
    end
end
```
F I G. 26
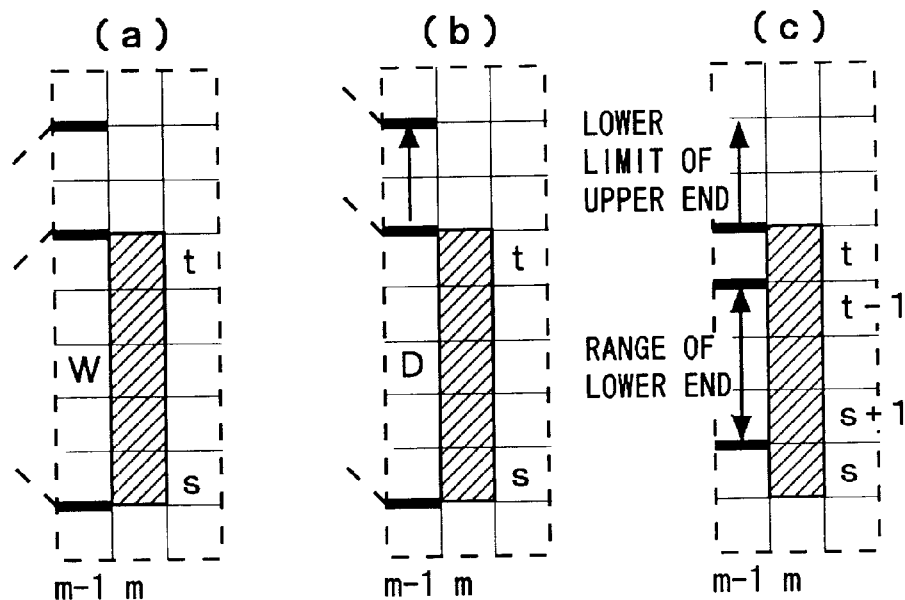
F I G. 27

```
for k=Ny-1 to 0 do
        for t=Ny-1 to k do
                s=t-k
                CALCULATE f_m^N(s,t) USING EXPRESSION 38
        end
end
```

| 31, 30 | 29, ... , 0 |
|---|---|
| CHANGE TENDENCY Y | SECTION [u, v] |
F I G. 3 0
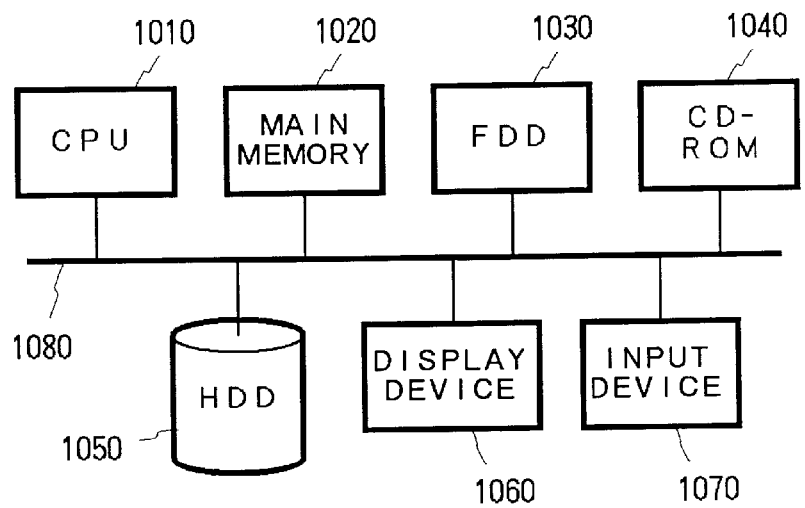
F I G. 3 2
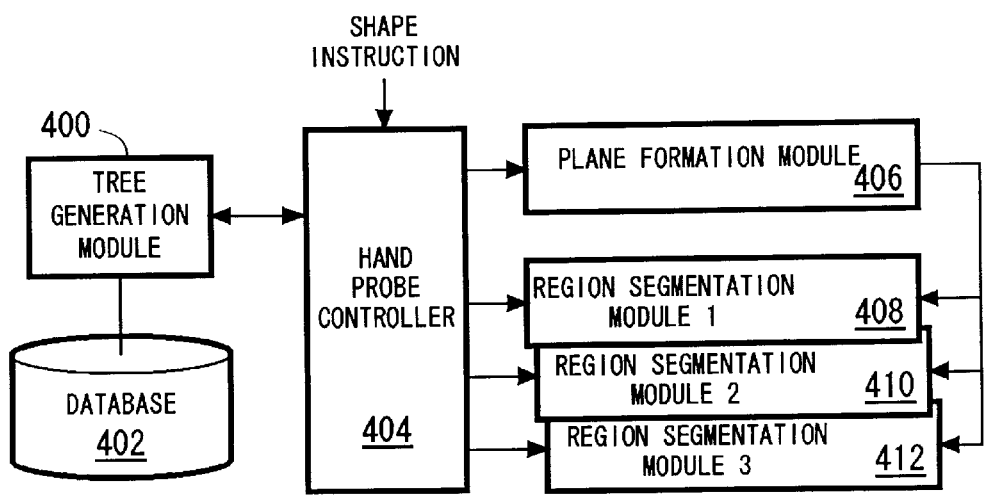
F I G. 3 3

REGRESSION TREE GENERATION METHOD AND APPARATUS THEREFOR

FIELD OF THE INVENTION

The present invention relates to the generation of a regression tree in order to predict an objective numeric attribute values of data in a database.

BACKGROUND ART

The technique employed for the prediction of the objective numeric attribute values of data in database (DB) can be applied broadly, to such purposes as calculation of insurance ratios, prediction of stock values or health diagnoses. One technique employed for predicting numeric attribute values involves the use of a tree structure called a regression tree that is constructed for the prediction of the objective numeric data attributes using the large amount of stored data. A regression tree is constructed by recursive splitting of a data set into subsets according to a specific typical rule.

FIG. 1 shows an example regression tree for predicting salaries in a client DB. In FIG. 1, n denotes the number of data instances and m denotes an average salary. In this example, data of 1000 instances are handled and the average salary is 4800. First, the data are classified in accordance with whether or not the ages (Age) of clients are greater than 30. In the data set for ages greater than 30, there are 650 data instances and the average salary is 5200. In the data set for ages equal to or less than 30, there are 350 data instances and the average salary is 3250. Following this, the data set for which the ages are greater than 30 are classified in accordance with whether or not the balance is smaller than 2000. The data set for ages equal to or less than 30 are classified in accordance with whether the number of years employed (Years employed) is greater than 10.

By employing such a tree structure, DB data can be analyzed in view of a specific numeric attribute, such as salary, and a numeric attribute value in future data can be predicted.

Generally, a regression tree that satisfies the following conditions is regarded as appropriate. (1) The depth of the tree is small; (2) the number of vertexes (nodes) is small; and (3) the mean-square sum of differences between a value of a numeric attributes (hereinafter referred to as objective numeric attributes) which is object to calculation for data belonging to an end node, and a representative value in the node (for example, averages) is reduced at the end node. Since the generation of such a tree is very difficult, some approximate solutions are required. As the representative heuristic method, a method is employed whereby "a tree is generated from the root, and when a rule for splitting a node at individual steps is selected, it is calculated how the objective numeric attribute distributes in each subset when a data set is split into the subsets according to each rule. For example, the mean-squared error by splitting is calculated and the rule providing the smallest mean-squared error is selected as a splitting rule (or a rule for splitting)."

The final end condition of the tree is determined by the number of data, and the depth and the dispersion of the objective numeric attribute. When the value of an objective numeric attribute W of a tuple t in a database is t[W], the dispersion of subset data D having an average objective numeric attribute $\mu_D$ is expressed as Expression 4

$$\sum_{t \in D} (t[W] - \mu_D)^2$$

To select the splitting rule, for example, the mean-squared error is calculated for all available rules and the rule having the smallest mean-squared error is selected. The "available rules for splitting" are all defined for each of all attributes (predicative attributes) defined in a database, except for the objective numeric attribute, as (1) t[A] ∈ S' in which the predicative attribute A is a category attribute and a set of values available for the attribute A is denotes by S and S'∈ S and as (2) t[A]<v in which the predicative attribute A is a numeric attribute and a specific real number v that is available for the attribute A is employed.

Further, when a data set that satisfies the splitting rule R is $D^{true}$, a data set that does not satisfy the rule R is $D^{false}$, the number of data items in data set D is |D|, and the average value of the objective numeric attribute in the data set D is $\mu(D)$, the mean-squared error estimate function U(R) of the rule R for the data set D is represented as follows:

Expression 5

$$U(R) = \frac{\sum_{t \in D^{true}} (t[W] - \mu(D^{true}))^2 + \sum_{t \in D^{false}} (t[W] - \mu(D^{false}))^2}{|D|}$$

The average value of the objective numeric attribute is represented by the following expression:

Expression 6

$$\mu(D) = \frac{1}{|D|} \sum_{t \in D} t[W]$$

According to this method, a preferable regression tree can be constructed if there is no correlation between predicative attributes for predicting the objective numeric attribute. However, the predicative attributes are rarely completely independent. In the example in FIG. 1, "Age" and "Years employed" are predicative attributes for explaining the objective numeric attribute "salary." Broadly speaking, to explain salary, these two predicative attributes have a strong correlation so that salary increases as both of the predicative attributes are correlated with each other, the splitting method shown in FIG. 1 does not provide sufficient separation, from the viewpoint of the objective numeric attribute, and as a result, the size of the tree is increased. Further, an essential tendency, for example, "the objective numeric attribute value is high when two attributes are high at the same time," can not be easily discovered by following rules obtained by linear splitting along the nodes of the tree.

A method for cutting out an x monotone region (a region whose part overlapping with lines parallel with the y axis is contiguous or empty) to predict a value of a true or false (Yes-No) attribute is proposed in a paper (paper 1: "Data Mining Using Two-dimensional Optimized Association Rules: Scheme, Algorithms And Visualization," T. Fukuda, Y. Morimoto, S. Morishita and T. Tokuyama, in Proceedings of the ACM SIGMOD Conference on Management of Data, pp. 13–23, June 1996). A calculation for a region minimizing the mean-squared error for the numeric attribute is not taught.

Furthermore, a method for defining an interclass variance for a monochrome image and extracting an x monotone region to maximize the interclass variance is described in another paper (paper 2: "Polynomial-time Solutions To Image Segmentations," T. Asano, D. Chen, N. Kato and T. Tokuyama, In Proceedings, 7th ACM-SIAM Symposium On Discrete Algorithms, pp. 104–113, 1996). Since this method is used to cut a region out of a monochrome image, however, its employment for predicting a numeric attribute value of data in the present invention is not described.

SUMMARY OF THE INVENTION

It is one object of the present invention to generate a more desirable regression tree by employing two numeric attributes for a splitting rule.

It is another object of the present invention to provide a regression tree generation method whereby, the splitting/prediction accuracy of an objective numeric attribute relative to data can be enhanced by a small splitting count.

It is an additional object of the present invention to provide a method for finding a more preferable rule for splitting more rapidly.

For the example in FIG. 1, as shown in FIG. 2, a two-dimensional region Reg in the plane that is formed by two numeric attributes, Age and Years employed, is the preferable splitting rule. In FIG. 3, the two-dimensional region Reg is expressed as a regression tree. Conventionally, since the calculation of an optimal two-dimensional region, such as Reg, having a high degree of freedom is difficult, data is splitted by linear lines parallel to the other axes to generate a tree shown in FIG. 1. Each of the linear lines are described by a single predicative attribute, such as v1 (30 in FIG. 1) or v2 (10 in FIG. 1) in FIG. 2. The present invention employs the techniques described in the papers 1 and 2 and make it possible to use a two-dimensional region, such as Reg in FIG. 3, as the splitting rule.

However, a region minimizing the mean-squared error for the values of numeric attributes can not be found merely by combining the techniques in the papers 1 and 2. The inventors of the present invention found that the technique for minimizing the mean-squared error is equivalent to the technique for maximizing the interclass variance. Proof of this will be presented later. In addition, the technique described in paper 1 is extended so that the numeric attribute can be handled instead of a true or false attribute.

That is, a method for generating a regression tree for an objective numeric attribute of data in a database comprises the steps of: storing the number of data in each bucket and the sum of the objective numeric attribute values of data in each bucket so as to correspond to each bucket in a plane, wherein the plane has two axes respectively corresponding to two predicative numeric attributes of data included in the database and belonging to one node of the regression tree, and the plane is divided into N×M buckets; segmenting a bucket region that minimizes the mean squared error of values of the objective numeric attribute from the plane; generating two nodes for data inside of the segmented bucket region and for data outside of the segmented bucket region. By this way, it becomes possible to use a splitting rule by the two dimensional region such as in FIG. 2.

The storing step and said segmenting step described above may be performed for combinations of two predicative numeric attributes, and the method may further include a step of selecting a bucket region which has the minimum mean squered error among possible segemented bucket regions.

The shape of the segmented region may be a bucket region whose parts overlapping with lines, which are parallel with one axis of the two axes, are continuous or empty (x monotone region), or a bucket region whose parts overlapping with first lines, which are parallel with one axis of the two axes, are continuous or empty and whose parts overlapping with second lines, which are parallel with another axis of the two axes, are continuous or empty (rectilinear convex region), or a bucket region whose parts overlapping with lines, which are parallel with column axis of the two axes, are continuous or empty and whose number of muximum or minimum row overlapping with a line, which is parallel with row axis of the two axes, is fixed among columns within the region (base monotone region).

Another form of this invention includes the steps of: storing the number u(i,j) of data in each bucket (i,j) and the sum v(i,j) of the objective numeric attribute values of data in each bucket (i,j) so as to correspond to each bucket in a plane, wherein the plane has two axes respectively corresponding to two predicative numeric attributes of data included in the database and belonging to one node of the regression tree, and said plane is divided into N×M buckets; segmenting a bucket region that maximizes an interclass variance from the plane; generating two nodes for data inside of the segmented bucket region and for data outside of the segmented bucket region. As described above, the region which minimizes the mean-square error is the same as the region which maximizes the interclass variance. There is no reference which describes this issue.

In addition, the segmenting step includes the steps of: inputting a condition θ; segmenting a bucket region R from the plane, wherein the region R maximizes Expression 7

$$\sum_{(i,j) \in R} g(i,j) = \sum_{(i,j) \in R} (v(i,j) - \theta u(i,j))$$

This indicates the hand probing is used on a plane which mapped following two values:

Expression 8

$$\sum_{(i,j) \in R} u(i,j)$$

Expression 9

$$\sum_{(i,j) \in R} v(i,j)$$

The shape of the segmented region may be x monotone or rectilinear convex, or base monotone.

The above description is described in view of processing steps. However, it is possible to constitute an apparatus for performing the above steps. In addition, it is also possible for a person who has an ordinary skill to implement a program for causing a computer to execute the above steps and store the program into a storage medium such as a CD-ROM, or floppy disk.

BRIEF DESCRIPTION OF THE DRAWINGS

FIG. 12 is a drawing for explaining an x monotone region.

FIG. 13 is a drawing for explaining a method for deriving an x monotone region while keeping connectivity.

FIG. 16 is a drawing for explaining a rectilinear convex region.

FIG. 23 is a drawing for explaining the relationship between the m-th column and the m−1-th column in U-type. (a) is for explaining an expression (2) in the Expression 34, (b) for explaining an expression (3), (c) for explaining an expression (4).

FIG. 24 is a pseudo-code for explaining the calculation order of $f_m^U(m, t)$.

FIG. 25 is a pseudo-code for explaining an preprocessing algorithm for the calculation of D-type.

FIG. 26 is a drawing for explaining the relationship between the m-th column and the m−1-th column in D-type. (a) is for explaining an expression (2) in the Expression 37, (b) for explaining an expression (3), (c) for explaining an expression (4).

FIG. 27 is a pseudo-code for explaining the calculation order of $f_m^D(m, t)$.

FIG. 30 is a data structure for $H^X(m, [s,t])$.

FIG. 32 is a diagram illustrating an example configuration of an ordinary computer system implementing the present invention.

FIG. 33 is a block diagram illustrating a special device which performs the present invention.

DESCRIPTION OF THE SYMBOLS

Figure 1:
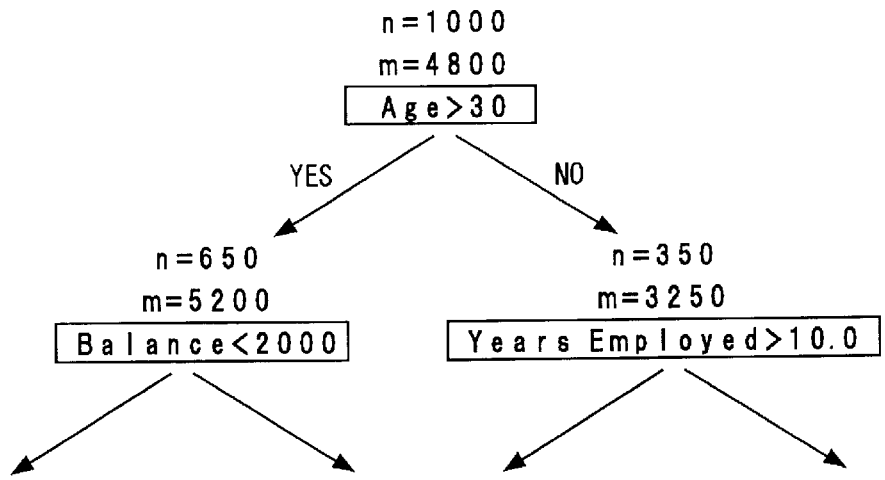
FIG. 1 is a diagram showing an example regression tree.
Figure 2:
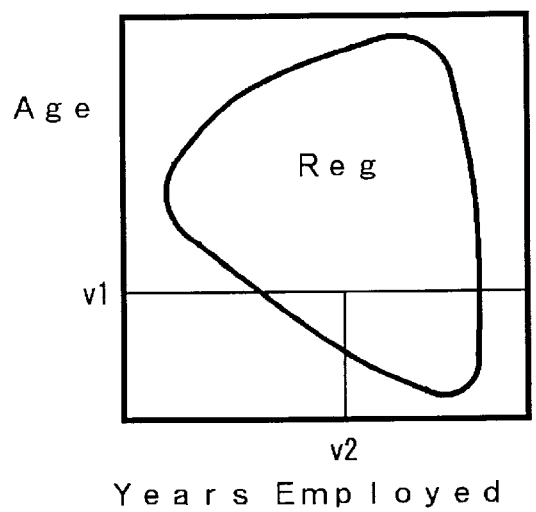
FIG. 2 is a diagram showing an example rule for splitting when two numeric attributes are handled.
Figure 3:
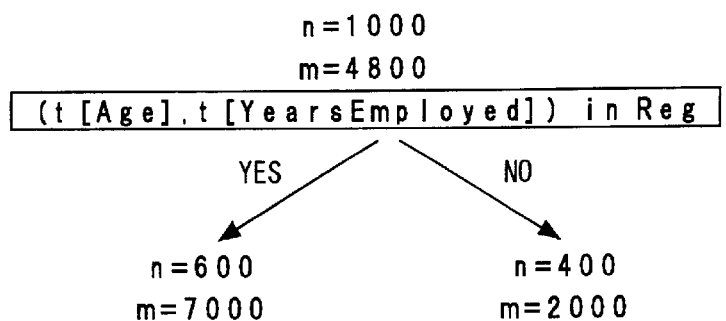
FIG. 3 is a diagram showing a regression tree for the example in FIG. 2.

1010: CPU
1020: Main memory
1030: FDD
1040: CD-ROM drive
1050: HDD
1060: Display device
1070: Input device
400: Tree generation module
402: Database
404: Hand probe controller
406: Plane formation module
408: Region segmentation module 1
410: Region segmentation module 2
412: Region segmentation module 3

DETAILED DESCRIPTION OF THE INVENTION

When generating a regression tree, it is necessary to calculate an optimal splitting rule for minimizing the mean-squared error. If the estimate function shown by expression 5 is employed, a calculation cost proportional to the number of tuples may occur for an estimate of the rule R. As described above, in the present invention, a region for maximizing an interclass variance can be found. The interclass variance is defined by the following equation.

$$V(R) = |D^{true}|(\mu(D^{true}) - \mu(D))^2 + |D^{false}|(\mu(D^{false}) - \mu(D))^2$$

For V(R), individual tuples in a data set need not be calculated. Furthermore, V(R) is compatible with hand probing based on touching oracle, which will be described later. As a result, the rule for splitting can be calculated rapidly.

The following is proof that Rule (R) for minimizing mean-squared error U(R) is equivalent to Rule (R) for maximizing interclass variance V(R).

Proof:

$$V(R) = |D^{true}|(\mu(D^{true}) - \mu(D))^2 + |D^{false}|(\mu(D^{false}) - \mu(D))^2$$
$$= -|D|\mu(D)^2 + (|D^{true}|\mu(D^{true})^2 + |D^{false}|\mu(D^{false})^2)$$

Since $-|D|\mu(D)^2$ is unchanged regardless of R, the maximization of V(R) is equivalent to the maximization of $(|D^{true}|\mu(D^{true})^2 + |D^{false}|\mu(D^{false})^2)$.

U(R) can be modified as follows.

Expression 10

$$U(R) = \frac{\sum_{t \in D^{true}} (t[W] - \mu(D^{true}))^2 + \sum_{t \in D^{false}} (t[W] - \mu(D^{false}))^2}{|D|}$$

$$= \frac{\sum_{t \in D} t[W]^2 - \left(|D^{true}|\mu(D^{true})^2 + |D^{false}|\mu(D^{false})^2\right)}{|D|}$$

Since the first term of a numerator and a denominator in expression 10 are unchanged regardless of R, the minimization of U(R) is equivalent to the maximization of $(|D^{true}|\mu(D^{true})^2 + |D^{false}|\mu(D^{false})^2)$.

As described above, a region for maximizing the interclass variance V(R) is enough for a region for minimizing the mean squared error. The algorithm for generating a regression tree will now be described.

Figure 4:
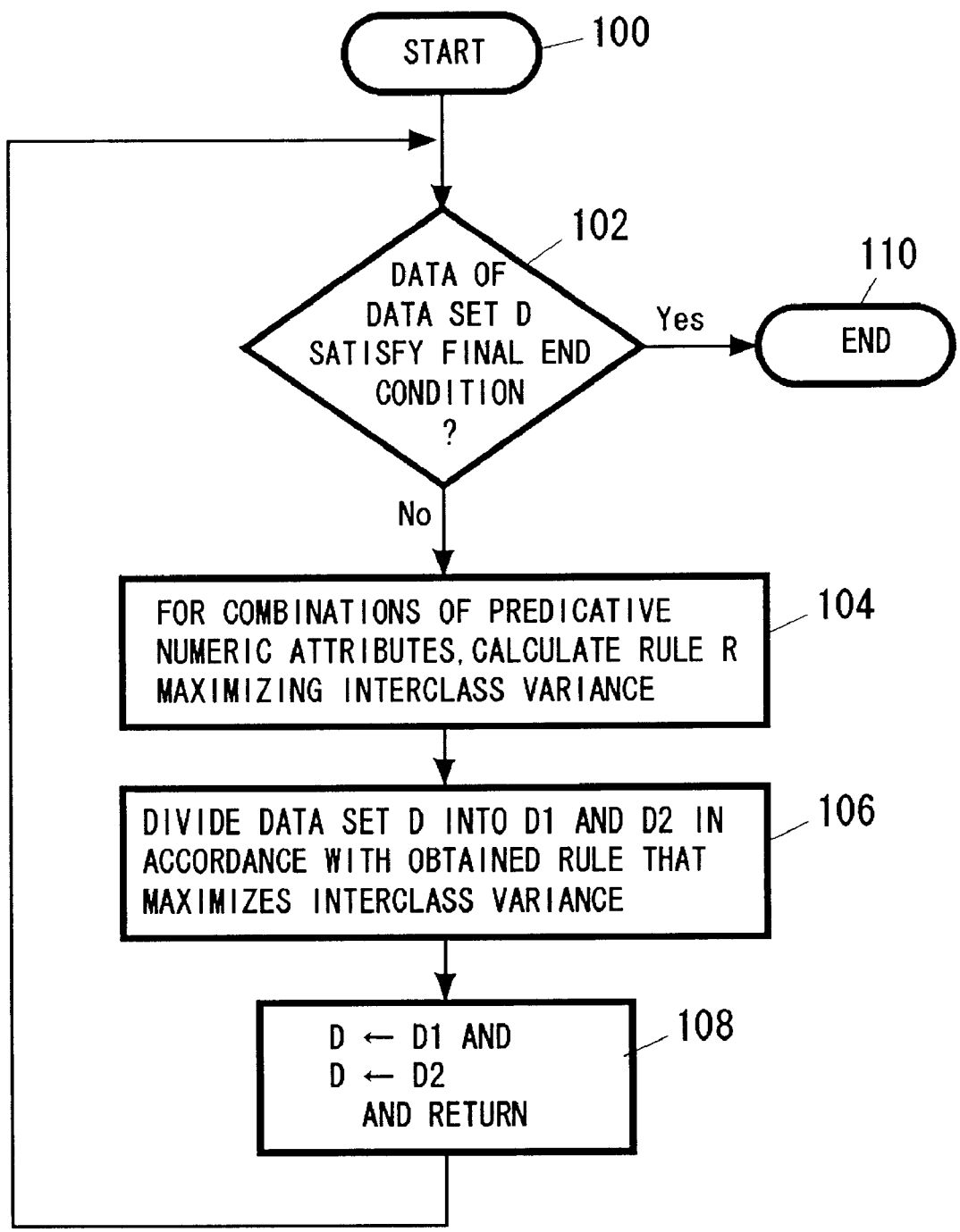
FIG. 4 is a high-level flowchart for a regression tree generation process.

The general processing for generating a regression tree, which has been partly described in "Background Art," is shown in FIG. 4. First, a check is performed to determine whether data in data set D satisfies the final end condition (step 102). If data set D is a set of initial data, it does not satisfy the final end condition and program control moves to the next step. When data set D is a result obtained by performing multiple iterations of the processing that will be described, data set D may satisfy a predetermined final end condition designated by a user. When data set D satisfies the final end condition, the processing is terminated (step 110).

The rule R for maximizing the interclass variance is calculated for a combination of predicative numeric attributes (step 104). If there is no particular problem, the rule is calculated for all the combinations. Originally in this process, since the object is the construction of the rule R from two numeric attributes, the data is to be splitted for the combination of predicative numeric attributes. However, in some cases, rule R for one predicative numeric attribute can be employed when splitting a data set. As previously mentioned, this is possible if a predicative attribute has a small correlation with another attribute. At step 104, therefore, the rule may be determined from such a single predicative attribute.

Data set D is divided into subsets D1 and D2 according to the rule having the maximum interclass variance selected from among all the derived rules (step 106). As described at step 104, if the interclass variance is calculated for the rule obtained for a single predicative attribute, the comparison can be performed at step 106. Then the step will be performed using the data set D as D1 or D2 (step 108).

Since the processing for a single predicative attribute is performed in the conventional manner, an explanation will now be given for a method for generating rule R for maximizing an interclass variance relative to two predicative numeric attributes.

The outline of the processing will now be explained referring to FIG. 5. First, a plane corresponding to two predicative numeric attributes is formed and is meshed (step 122, see FIG. 6). The individual mesh elements store the number of tuples in data set D that belong to the mesh element, and data of the sum of values of the objective numeric attribute for these tuples. An arbitrary method for forming the meshed plane shown in FIG. 6 is employed. As an example method, sampling of an adequate number of data in a data set D is performed, the resultant data are sorted according to the respective numeric attributes and the boundary values of the mesh elements are acquired from the sorting result, and all the data are classified to the mesh elements. Furthermore, all the data may be sorted and the boundary values of the mesh elements may be determined by using the sorting result. In addition, the boundary values of the mesh elements may be determined first and all the data may be classified according to the boundary values. The mesh elements are sometimes called buckets.

The shape of the region R to be cut out of the plane is designated (step 124). This step may be performed first. The shape of the extracted region R is x monotone, rectilinear convex or base monotone. This will be described later. The region R can also have another shape. Finally, probing parameter θ is changed and the region R for maximizing the interclass variance is cut out of the plane (step 126). This region R is defined as a rule R.

The region extraction is performed by hand probing. According to the hand probing method, when, in a plane (FIG. 7) where a tuple count x(R) in the region R and a sum y(R) of values of the objective numeric attribute in the region R are employed as axes, a point set that comprises (x(R), y(R)), relative to all the region group R, is denoted by P (white and black dots in FIG. 7) and the convex hull of P is denoted by conv(P) (black dots in FIG. 7), points on the convex hull conv(P) can be calculated rapidly by a geometric method. Hand probing is a method for acquiring the convex hull by touching oracle, i.e., "by assuming a linear line having a slope θ, y=θx+A, by maximizing (or minimizing) Y-intersect A so that the linear line contacts the convex hull conv(P), and by acquiring the contact point on the convex hull." Here, the probing parameter θ corresponds to the slope θ.

Figure 6:
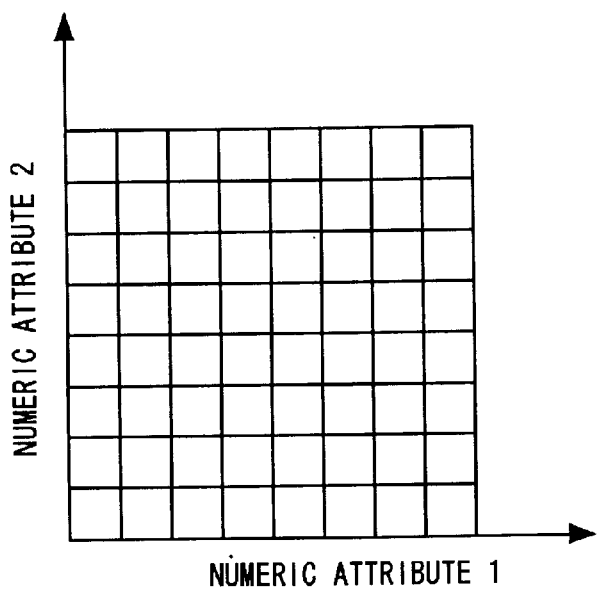
FIG. 6 is a diagram showing a plane that is formed by two numeric attributes.
Figure 7:
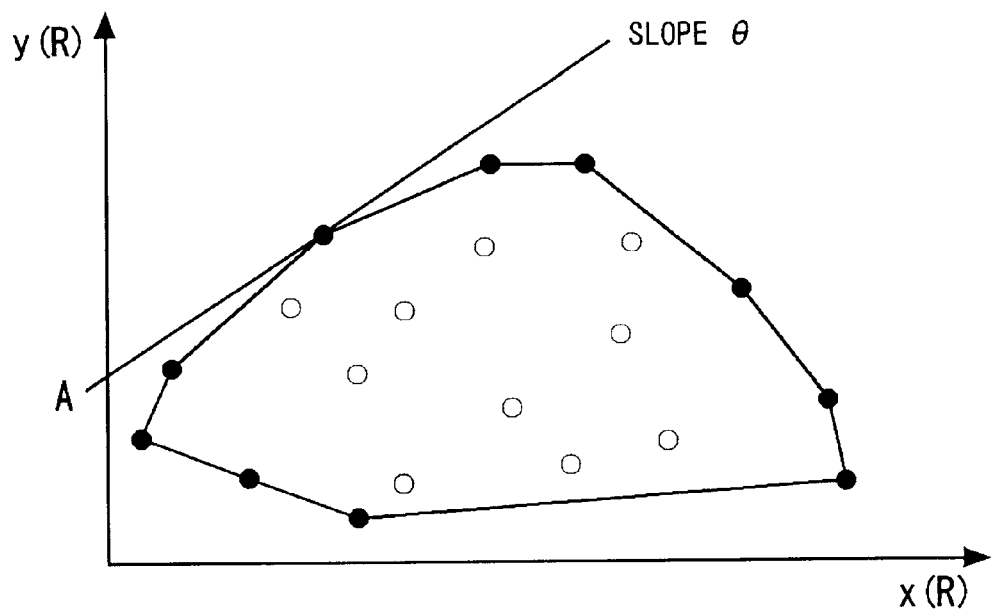
FIG. 7 is a graph showing an x(R), y(R) plane.

That is, a point for maximizing an objective interclass variance exists on the convex hull conv(P) in the plane shown in FIG. 7. The convex function of the interclass variance function will be explained. When the number of all the data in meshed plane G in FIG. 6 is denoted as N and the sum of the objective numeric attribute values of all the data is denoted by y(G), the previously mentioned interclass variance V(R) is modified as follows:

Expression 11

$$V(R) = V(x(R), y(R))$$

$$= x(R)\left(\frac{y(G)}{N} - \frac{y(R)}{x(R)}\right)^2 +$$

$$(N - x(R))\left(\frac{y(G)}{N} - \frac{y(G) - y(R)}{N - x(R)}\right)^2$$

Assuming that x(R)=x and y(R)=y and that, for convenience sake, the average of the objective numeric attribute values for all the data in the plane G is y(G)/N=0, y(G)=0 when N≠0, and interclass variance function V(x, y)=f(x, y) is represented as follows:

Expression 12

$$V(x, y) = f(x, y) = y^2\left(\frac{1}{x} + \frac{1}{N - x}\right)$$

Proposition:
Expression 12 is the convex function in a region N>x>0 when

Expression 13

$$\frac{f(x_1, y_1) + f(x_2, y_2)}{2} \geq f\left(\frac{x_1 + x_2}{2}, \frac{y_1 + y_2}{2}\right)$$

is established for two vectors $(x_1, y_1)$ and $(x_2, y_2)$ where $N > x_1, x_2 > 0$.

Proof:

Assume that vector $(\delta_1, \delta_2)$ is $\Delta$ and that inner product $\delta_1 x + \delta_2 y$ of vector $(x, y)$, which indicates a point in a region $N > x > 0$, and $\Delta$ is V. $\partial^2 f(x, y)/\partial V^2 \geq 0$ will now be proved for arbitrary $\Delta$.

When $\delta_1$ and $\delta_2 \neq 0$,

Expression 14

$$\frac{\partial f(x, y)}{\partial V} = \frac{\partial f(x, y)}{\partial x} \cdot \frac{1}{\delta_1} + \frac{\partial f(x, y)}{\partial y} \cdot \frac{1}{\delta_2}$$

$$= y^2 \left(\frac{-1}{x^2} + \frac{1}{(N-x)^2}\right) \frac{1}{\delta_1} +$$

$$2y \left(\frac{1}{x} + \frac{1}{N-x}\right) \frac{1}{\delta_2}$$

Expression 15

$$\frac{\partial^2 f(x, y)}{\partial V^2} = \left\{ y^2 \left(\frac{2}{x^3} + \frac{2}{(N-x)^3}\right) \frac{1}{\delta_1} + \right.$$

$$2y \left(\frac{-1}{x^2} + \frac{1}{(N-x)^2}\right) \frac{1}{\delta_2} \right\} \frac{1}{\delta_1} +$$

$$\left\{ 2y \left(\frac{-1}{x^2} + \frac{1}{(N-x)^2}\right) \frac{1}{\delta_1} + \right.$$

$$2 \left(\frac{1}{x} + \frac{1}{(N-x)}\right) \frac{1}{\delta_2} \right\} \frac{1}{\delta_2}$$

$$= \frac{2}{x} \left(\frac{y}{x \delta_1} - \frac{1}{\delta_2}\right)^2 +$$

$$\frac{2}{N-x} \left(\frac{y}{(N-x)\delta_1} + \frac{1}{\delta_2}\right)^2 \geq 0$$

When $\delta_1 \neq 0$ and $\delta_2 = 0$

Expression 16

$$\frac{\partial^2 f(x, y)}{\partial V^2} = y^2 \left(\frac{2}{x^3} + \frac{2}{(N-x)^3}\right) \frac{1}{\delta_1^2} \geq 0$$

When $\delta_1 = 0$ and $\delta_2 \neq 0$,

Expression 17

$$\frac{\partial^2 f(x, y)}{\partial V^2} = 2 \left(\frac{1}{x} + \frac{1}{(N-x)}\right) \frac{1}{\delta_2^2} \geq 0$$

The following things are obtained from the convex function property of the interclass variance function.

Figure 8:
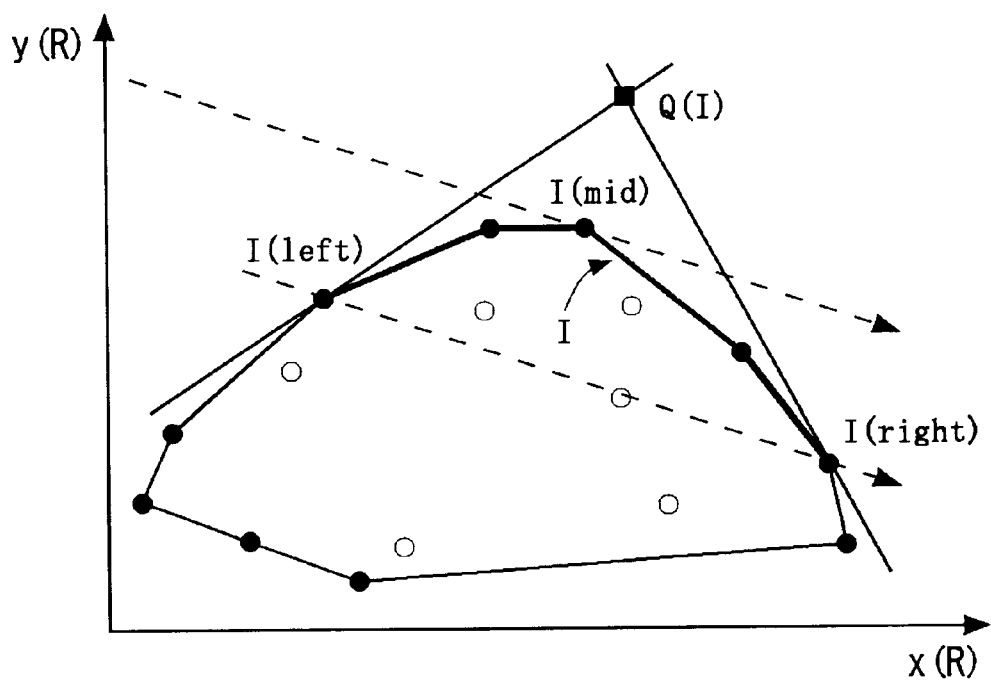
FIG. 8 is a graph for explaining the method for rapidly acquiring points on a convex hull in the plane in FIG. 7.

Assume that two vertexes (contact points) obtained by probing using two probing parameters are I(left) and I(right) (FIG. 8). When the interclass variance values at intersection Q(I) of two tangents that are used to acquire the two points are equal to or smaller than the current maximum interclass variance value found during the search, the maximum interclass variance is not provided for any split corresponding to vertexes on the convex hull between vertexes I(left) and I(right). In other words, the interclass variance value at intersection Q(I) is greater than any other interclass variance value on the convex hull between vertexes I(left) and I(right). This interclass variance value is called an upper bound. When the interclass variance value at intersection Q(I) is not greater than the current maximum interclass variance value, the convex hull between I(left) and I(right) need no longer be searched.

According to the convex function property and the above described property of the interclass variance, points on a convex hull for maximizing the interclass variance value can be efficiently found in the plane shown in FIGS. 7 and 8. In order to find points on the convex hull for maximizing the interclass variance value, a method for setting $\theta$ will now be described referring to FIGS. 9 to 11.

Figure 9:
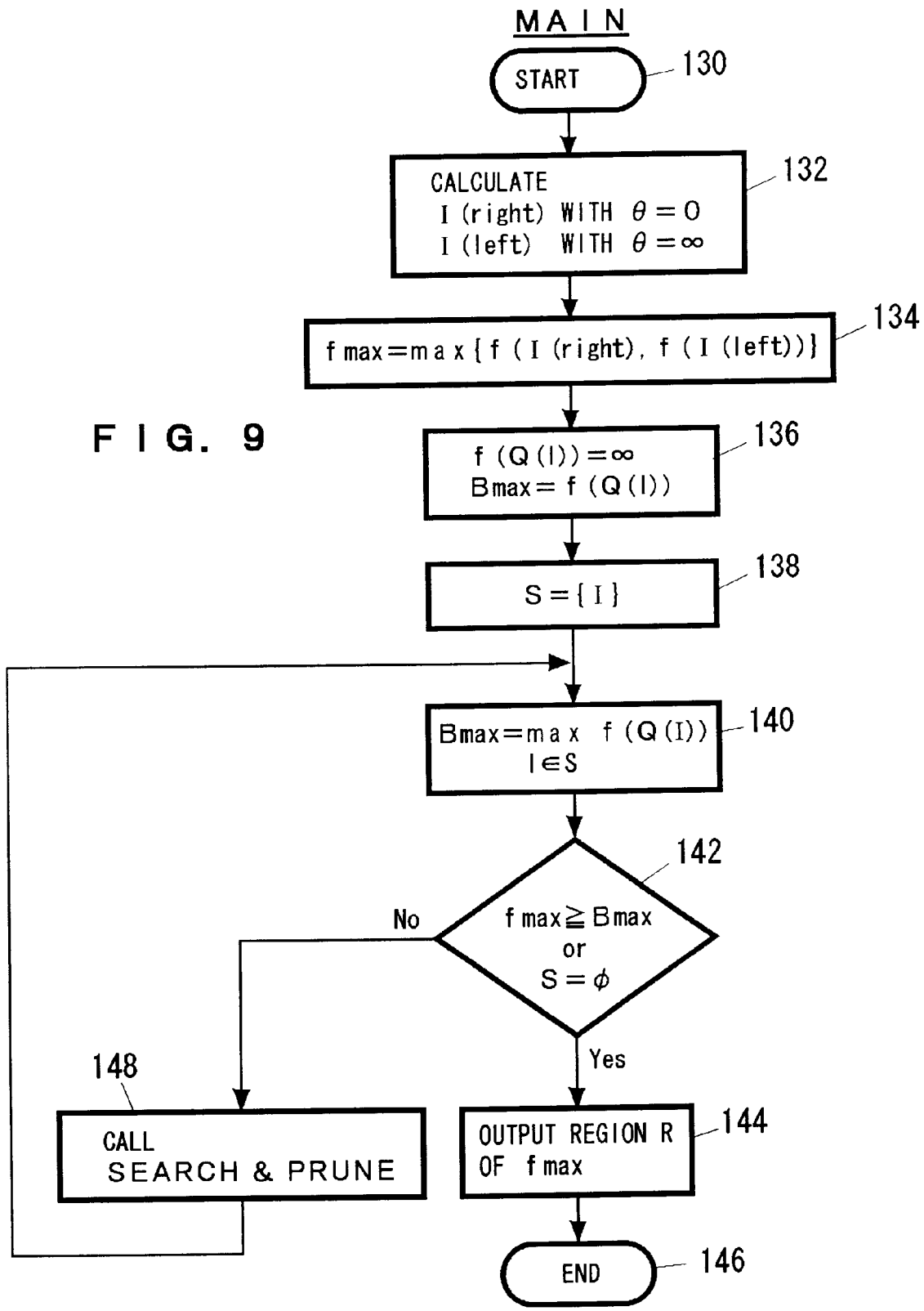
FIG. 9 is a flowchart for an example method for rapidly acquiring points on the convex hull in the plane in FIG. 7.

FIG. 9 is a main (MAIN) flowchart. First, I(right) is calculated with $\theta = 0$ (horizontal), and I(left) is calculated with $\theta = \infty$ (vertical) (step 132). Coordinate (x, y) of I(right) in FIG. 8 is input to the interclass variance function f(x, y) (a modification of Expression 11), and the result is defined as f(I(right)). Similarly, f(I(left)) is defined for I(left). The larger of the two interclass variance values is input to $f_{max}$ (step 134). Interclass variance value f(Q(I)) at upper bound Q(I) for I(right) and I(left) is defined as $\infty$, and f(Q(I)) is input to a variable $B_{max}$ (step 136). The interval between I(right) and I(left) is defined as I, which is input to set S for the interval (step 138).

The maximum value of the interclass variance value f(Q(I)) for upper bound Q(I) of I included in the set S for the interval is input to the variable $B_{max}$ (step 140). At the first iteration, I is only one and f(Q(I))=$\infty$ and this value is again input to the variable $B_{max}$. Then, a check is performed to determine whether or not $f_{max} \geq B_{max}$ or S is an empty set (step 142), that are the iteration end condition. The first condition $f_{max} \geq B_{max}$ means that there is no maximum value $B_{max}$ of the interclass variance value for the upper bound, that is greater than maximum interclass variance value $f_{max}$ at a point on the convex hull that has been obtained. If this condition is established, it is assumed that region R including $f_{max}$ is the objective rule R, and this region R is output (step 144). If the end condition is not established, a SEARCH&PRUNE process is called (step 148).

Figure 10:
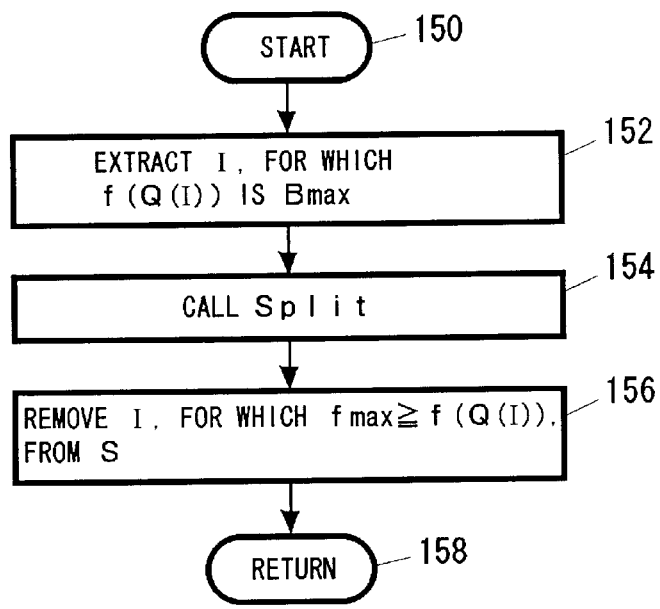
FIG. 10 is a flowchart for the example method for rapidly acquiring points on the convex hull in the plane in FIG. 7.

The SEARCH&PRUNE process is shown in FIG. 10. In this process, first, I, for which f(Q(I)) is $B_{max}$, is extracted and is processed (step 152). At the first iteration, the interval I between I(right) and I(left) is extracted unchanged. Then, the Split process is called (step 154). This process for dividing the interval I will be described later referring to FIG. 11. When the Split process has been completed, interval I, wherein $f_{max} \geq f(Q(I))$ is established, is removed from intervals included in set S (step 158). This is done because no point to be obtained exists in the interval I on the convex hull if the interclass variance f(Q(I)) for teh upper bound of the interval I is not greater than $f_{max}$.

Figure 11:
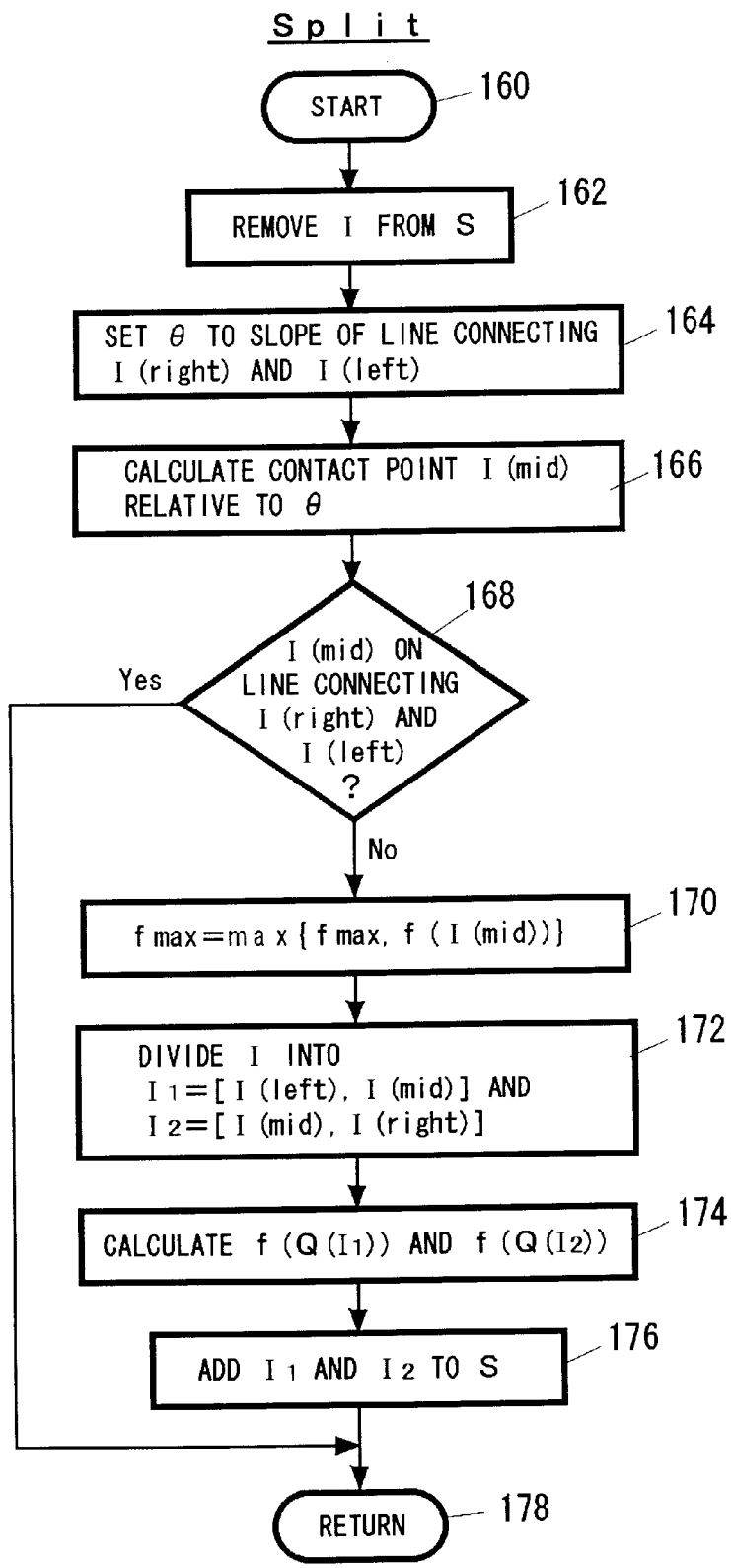
FIG. 11 is a flowchart for the example method for rapidly acquiring points on the convex hull in the plane in FIG. 7.

The Split process will now be described referring to FIG. 11. To split specific interval I, that interval I is removed from interval set S (step 162). $\theta$ is set to a slop for a line that connects I(left) and I(right) (step 164). Contact point I(mid) relative to $\theta$ is calculated (step 166). If I(mid) exists on the line that connects I(right) and I(left) (step 168), points on the convex hull no longer exist between I(left) and I(right), and program control returns to SEARCH&PRUNE (step 178).

When I(mid) doesn't exist above the line that connects I(left) and I(right), a greater value of either $f_{max}$ or f(I(mid))

is input to $f_{max}$ (step 170). Then, interval I is split into $I_1$=[I(left), I(mid)] and $I_2$=[I(mid), I(right)] (step 172). Further, $f(Q(I_1))$ and $f(Q(I_2))$ are calculated (step 174). Finally, $I_1$ and $I_2$ are added to the interval set S (step 176). Program control thereafter returns to SEARCH&PRUNE (step 178).

Since an interval for which a search is not required can be removed at an early stage in the above processing, a point on a desired convex hull can be obtained rapidly. It should be noted that although only the upper portion of the convex hull is processed in FIGS. 9 to 11, the same process can be applied for the lower portion by replacing the maximizing of θ in expression 1 (or expression 7) with the minimizing of θ. In addition, since the interclass variance acquired for the lower portion of the convex hull should be greater than that for the upper portion, the interclass variance value obtained for the upper portion can be employed for the removal of intervals, and the processing speed can be increased.

Figure 5:
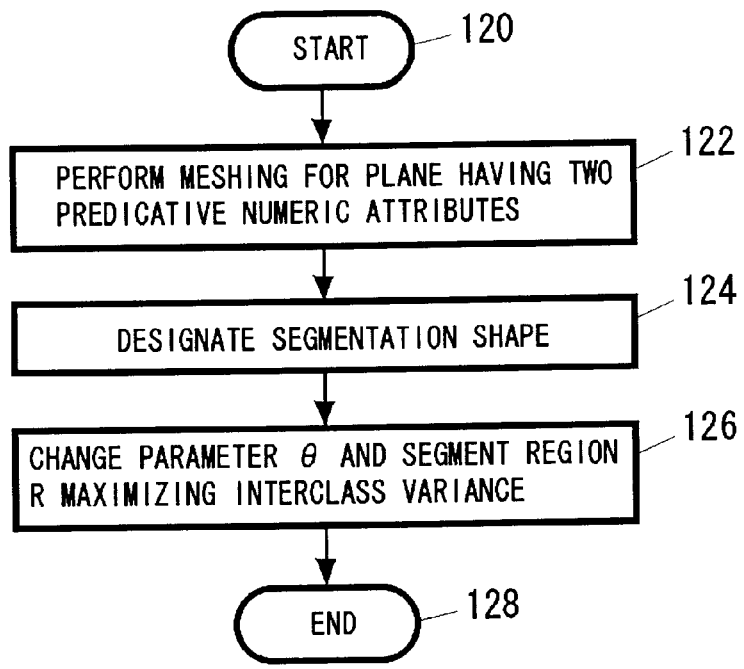
FIG. 5 is a high-level flowchart for extracting a two-dimensional region.

The method for determining the probing parameter θ at step 126 in FIG. 5 has been explained. As apparent in the processes in FIGS. 9 to 11, extraction of a specific region from the plane in FIG. 6 is required in order to obtain the interclass variance value or a coordinate value in FIG. 7 ((x, y) or x(R), y(R) in expression 11) for a single parameter θ. An explanation will now be given for A. Algorithm for extracting an x monotone region (including a base monotone region), and B. Algorithm for extracting a rectilinear convex region when one θ is determined.

A. Algorithm For Segmenting a x Monotone Region

It assumes that processing is completed as far as a plane forming in step 122 represented in FIG. 5. Each mesh element stores the number u(i,j) of tuples which belong to the mesh element (i,j) among data set D (u(i,j) is also called data number.) and the sum v(i,j) of values of the objective numeric attribute of tuples which belong to the mesh element (i,j) among data set D. Note that i is a coordinate value in the vertical axis and j is a coordinate value in the horizontal axis on the plane shown in FIG. 6.

First, an x monotone region is explained. Shown in the left of FIG. 12 is an example where a region is always connected when it is cut by bands with width 1 extending in the Y-axis direction. Such region is called the x monotone region. In the right, there is shown an example where a region is not connected when it is cut by the bands described above. The region in the right is not x monotone. The problem for segmenting an x monotone region can be solved by sequentially connecting bands extending in the Y-axis direction by using dynamic programming, since they are always connected.

As described above, drawing a straight line with gradient (slope) θ from the top by using hand probing means reducing A which is a Y-intersect of a straight line y=θx+A. In other words, it is a problem to find a point on the plane shown in FIG. 7, which has the X-coordinate x(R) which maximizes A=y(R)−θx(R). Thus, it is modified to:

Expression 18

$$\max A = \max[y(R) - \theta x(R)]$$
$$= \max \left\{ \sum_{(i,j) \in R} v(i,j) - \theta \sum_{(i,j) \in R} u(i,j) \right\}$$
$$= \max \sum_{(i,j) \in R} g(i,j)$$

where

Expression 19

$$g(i,j) = v(i,j) - \theta u(i,j).$$

Now, it is considered how to solve Expression 18. Basically, an approach using the dynamic programming described earlier is employed. First, an area comprising buckets to the left of m-column and including a bucket at a position (m, t) is assumed, and that maximizing an objective function, Expression 19, is to be f (m, t). Then, it satisfies the following conditions:

Expression 20

$$f(m,t) = \max_{t,l \in I} \left\{ f(m-1,l) + \underbrace{\sum_{i \in I} g(i,m)}_{B} \right\}$$

$$= \max_{l} \underbrace{\left\{ f(m-1,l) + \max_{t,l \in I} \sum_{i \in I} g(i,m) \right\}}_{A}$$

where A is the second term, and B is the result of the sum operation in the second term.

A in Expression 20 means to determine from the entire continuous interval (range) containing t and l a continuous interval (range) I maximizing B in Expression 20. See FIG. 13. It is the same plane as in FIG. 6.

This I is represented as cover (t, l). Now, if t≦l, and low (t) and high (l), which are defined later, are used, Expression 21

$$\text{cover}(t,l) = [\text{low}(t), t] \cup [t,l] \cup [l, \text{high}(l)]$$

where low (t) is i maximizing B in Expression 20 in the entire continuous interval [i, t], while high (l) is j maximizing B in Expression 20 in the entire continuous interval [l, j].

Since these low (t) and high (l) are frequently used in the dynamic programming, it is effective if they are quickly found. To this end, a matrix K is constructed in which B in Expression 20 of the continuous interval [i, j] is contained in an element K (i, j), where K (i, j)=(i−j) x for i>j (x is a negative value with a sufficiently large absolute value. For example, it is sufficient to be a number the absolute value of which is larger than sum of entire u (i, j) ). Then, the column number for a column having the maximum value at row number l becomes high (l). Thus, the problem to find high (l) for all l ∈ [1, N] becomes a problem to find column number for the maximum value at each row of K. Such calculation can be performed with amount of calculation for O (N). When determining the maximum column number, the comparison of the matrix elements is performed for judging whether the value is maximum.

When the maximum value of each row is noted in K, the column number for maximum value monotonically increases as the row number increases. However, if there are a plurality of maximum values on the same row, only the one at the left end is considered. Such matrix is referred to a "monotonic matrix." Although its demonstration is omitted, the matrix K is also a "completely monotonic matrix" (a matrix in which any partial matrix is a monotonic matrix). O (N log N) as amount of the calculation is required to calculate column numbers having the maximum values at all rows in a monotonic matrix. The algorithm for finding the column number of the maximum value in each row is well known, and described, for example, in Chapter 4 "Basic Technique of Computational Geometry" of "Computational Geometry," Tetsuo Asano, Asakura Shoten, September 1990.

Likewise, when low (t) is calculated, it is obtained by constructing a matrix L in which B in Expression 20 of the continuous interval [i, j] is contained in an element L (j, i), and finding the column number for a column having the maximum value at the row number t. Here, the upper triangular area (i>j) is to be −∞. Such matrix is also a completely monotonic matrix.

Using low (t) and high (l) thus found, cover (t, l) can be found so that the following equation which is a variation of Expression 20 can be calculated.

Expression 22

$$f(m, t) = \max_{l}\left\{f(m-1, l) + \sum_{i \in cover(t,l)} g(i, m)\right\}$$

A region making f (m, t) maximum can be found by sequentially calculating f (m, t) for bands perpendicular to the X-axis, storing these bands, and then connecting them. See FIG. 13. X and Y are axes respectively corresponding to two numeric attribute.

To further improve the speed, a matrix M is constructed which has

Expression 23

$$M(t, l) = f(m-1, l) + \sum_{i \in cover(t,l)} g(i, m)$$

as its element. Then, the maximum value of the row number t is f (m, t). M is a completely monotonic matrix described above, and f (m, t) can be calculated for all t with O (N). Thus, O ($N^2$) as amount of calculation is necessary to calculate f (m, t) for all m.

While detail is described in the above, necessary steps are as follows:

(1) Calculate low (t) and high (l) for all bands perpendicular to the X-axis.
(2) Calculate a matrix M whose element is Expression 23 since cover (t, l) is found from low (t) and high (l).
(3) Find the maximum value of each row in the matrix M, and store their values as f (m, t).
(4) Enter the column number l storing the maximum value of each row in the matrix M into s (m, t) to determine the entire region.
(5) Find m and t maximizing f (m, t), and determine the region with low (t) and high (l) of the previous column by using s (m, t) obtained in (4) and l stored in s (m, t).

Because it is necessary to calculate the interclass variance, x(R) and y(R) are also necessary. See Expression 8 and Expression 9. This calculation may be performed after the determination of the entire region or during the determination.

Figure 14:
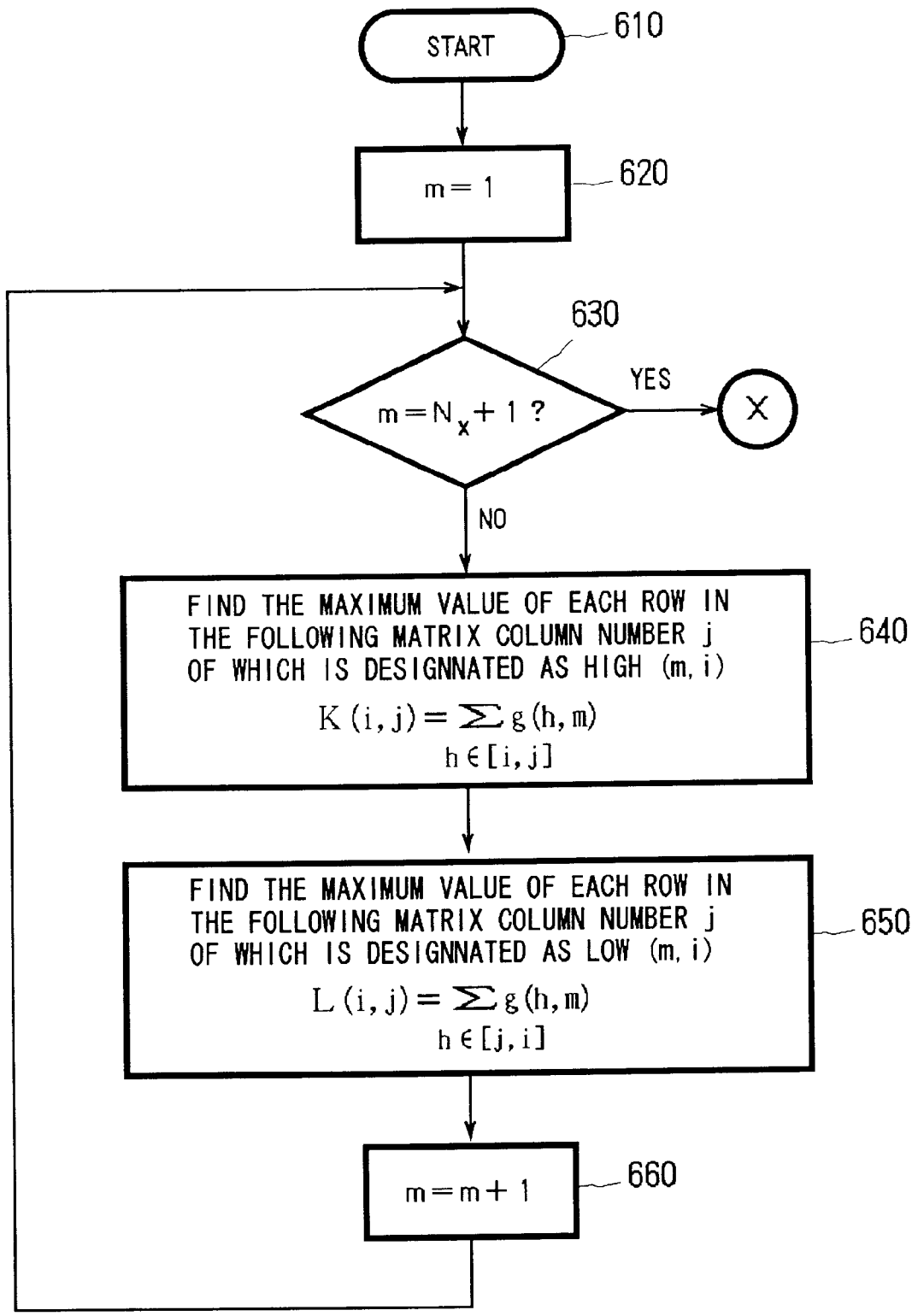
FIG. 14 is an example flowchart for segmenting an x monotone region.
Figure 15:
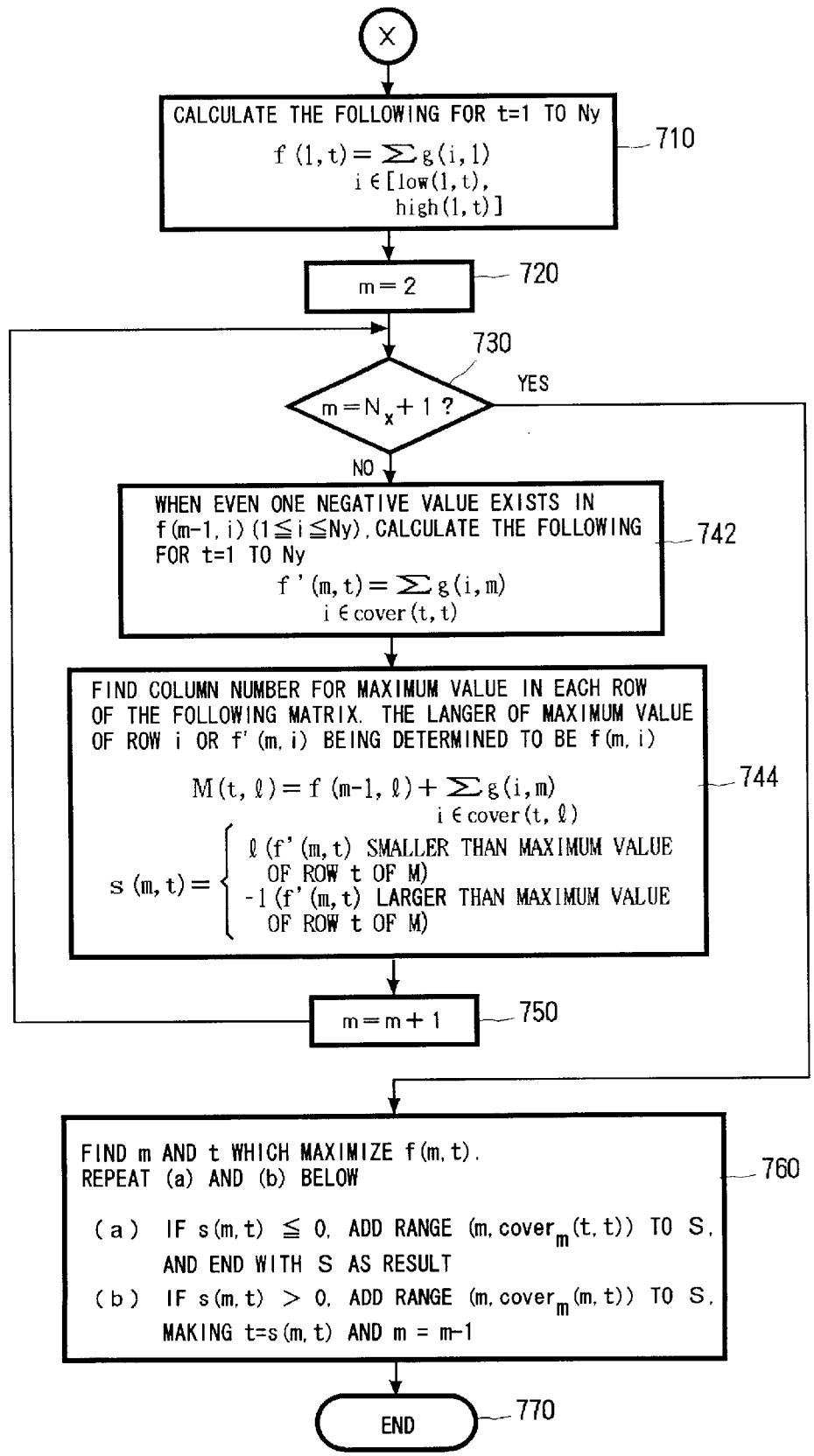
FIG. 15 is an example flowchart for segmenting an x monotone region.

These steps are shown in FIGS. 14 and 15. The process started at step 610 performs initialization of m=1 at step 620. It is then determined whether m=$N_x$+1 (step 630). This is to repeat the loop $N_x$ times where $N_x$ is the number of columns in u (i, j) and v (i, j).

Then,

Expression 24

$$K(i, j) = \begin{cases} (i, j)x & (i > j) \\ \sum_{h \in [i,j]} g(h, m) & (i \le j) \end{cases}$$

is calculated to find the maximum value of each row in this matrix the column number j of which is designated as high (m, i) (step 640). Thus, high (i) on m-th column of the plane (FIG. 13) is found.

In addition,

Expression 25

$$L(i, j) = \begin{cases} -\infty & (j > i) \\ \sum_{h \in [j,i]} g(h, m) & (j \le i) \end{cases}$$

is calculated to find the maximum value of each row in this matrix the column number j of which is designated as low (m, i)=j (step 650). Thus, low (i) on m-th column of the plane (FIG. 13) is found.

Then, the process increments m by 1 (step 660), and returns to step 630. As described, first, all low and high are previously calculated. Although it may be arranged to calculate necessary low and high every execution of calculations in FIG. 15, they may be calculated at once as in this example. After they are calculated at once as described above, the process proceeds to FIG. 15 through X.

In FIG. 15, the process calculates f (m, t) from X. First, processing is performed on the left most column of said plane as shown in FIG. 13.

Expression 26

$$f(1, t) = \sum_{i \in [low(1,t),high(1,t)]} g(i, 1)$$

is calculated for t=1 to $N_y$ (step 710). Here, $N_y$ is the number of rows in u (i, j) and v (i, j). With such procedure, one to be the initial value of the first term in Expression 23 is calculated.

In addition, it is arranged s (l, t)=−1. This is to explicitly indicate that there is no connection in the previous column because this is the first column.

Then, m is set to m=2 to calculate values for m=2 and thereafter (step 720). In addition, it is determined whether m=$N_x$+1 to repeat the loop ($N_x$−1) times (step 730). If not m=$N_x$+1, and when even one negative value exists in f (m−1, i) (1≦i≦$N_y$), Expression 27

$$f'(m, t) = \sum_{i \in cover_m(t,t)} g(i, m)$$

is calculated for t=1 to $N_y$ (step 742). Here, $cover_m$ (t, t) means cover (t, t) on the m-th column. Then, Expression 28

$$M(t, l) = f(m-1, l) + \sum_{i \in cover_m(t,l)} g(i, m)$$

The column number for the maximum value in each row of this matrix is found (step 744). Then, the maximum value of row i is compared with f' (m, i), and the larger one is determined to be f (m, i). Then, l is placed in s (m, t) when f' (m, t) is smaller than the maximum value of row t in M, otherwise, −1 is placed. This is to determine whether the value of the objective function for the region to be segmented is made larger by preserving the connection up to the previous column, or by discarding it.

Since, as described, s (m, t) is provided to preserve the connected state, if an (m, t) is determined, it can be determined later how the areas (stripes) are connected by tracing back s (m, t).

Then, the process increments m by 1 (step 750), and returns to step 730. When the repetition completes, m and t maximizing f (m, t) are found. It is sufficient that m and t always providing maximum are arranged to be continuously held while constructing f (m, t), and to be updated when a point which has a value lager than that of m and t being held is encountered in a newly created region. l for the previous column is found from s (m, t) by using m and t. The smaller of l and t is entered in low, and the larger is entered in high. For example, if t is the smaller, low (m, t) and high (m, l) can be found. Furthermore, since l' in the previous column is found from s (m−1, l), low (m−1, l') and high (m−1, l') are found. (Here, l is smaller than l'.) When such procedure is repeated, the entire region R can be determined (step 760). When −1 is obtained for a certain s (m, t), the region completes. This completes the process because the x monotone region R corresponding to the gradient θ which has been input is obtained (step 770).

If low (t) or high (t) is fixed to a predetermined value, it is possible to segment a base monotone region in the same processing.

B. Algorithm For Segmenting a Rectilinear Convex Region

This process is to segment a rectilinear convex region from the previously created plane. An example of the rectilinear convex region is shown in FIG. 16. The rectilinear convex region means a region in which (1) the stripes which overlap with lines parallel with the y-axis are always continuous or empty, and (2) the stripes which overlap with lines parallel with the x-axis are always continuous or empty. The left region in FIG. 16 is a rectilinear convex region, because the stripes which overlap with any line parallel with the y-axis are continuous or empty and the stripes which overlap with any line parallel with the x-axis are continuous or empty. On the other hand, in the right region in FIG. 16, the stripes which overlap with lines parallel with the x-axis are always continuous or empty, but the stripes which overlap with lines parallel with the y-axis include those which are not continuous. Accordingly, this region is not a rectilinear convex region.

Figure 17:
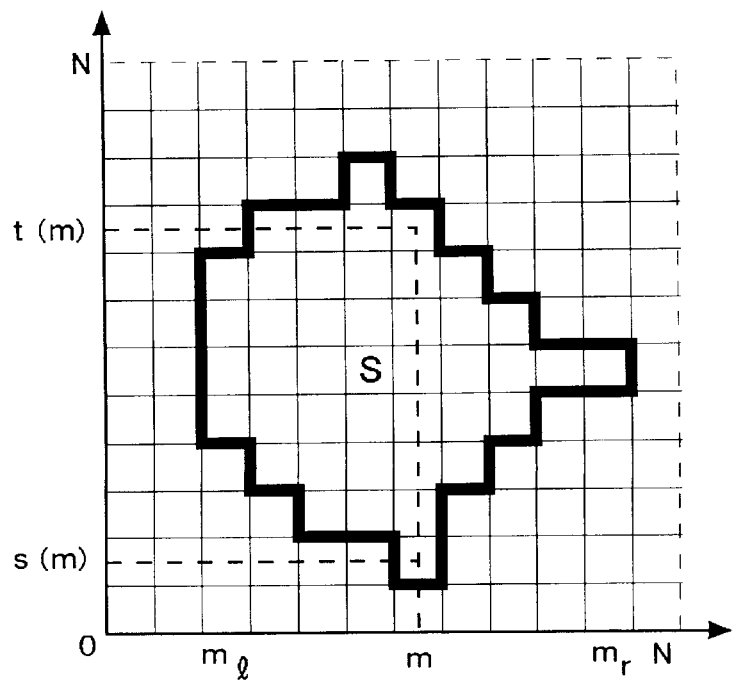
FIG. 17 is a drawing for explaining the nature of the rectilinear convex region.

Because background conditions are the same as in the segmentation of x monotone region, the Expression 18 must be solved. First, the nature of a rectilinear convex region is represented by the relation among pixels (buckets) in the region. S is assumed to be a rectilinear convex region in a pixel plane (a bucket plane). $m_1$ and $m_r$ are assumed to be the column numbers of the left end and the right end of S, respectively. The pixel numbers of the lower end and the upper end of the m-th column ($m_1 \leq m \leq m_r$) of S are assumed to be s(m) and t(m), respectively. These positional relationships are well understood if FIG. 17 is referenced. The tendency of change of the section [s(m), t(m)] in the m-th column is defined as follows by comparison with the section in the m−1-th column.

Figure 18:
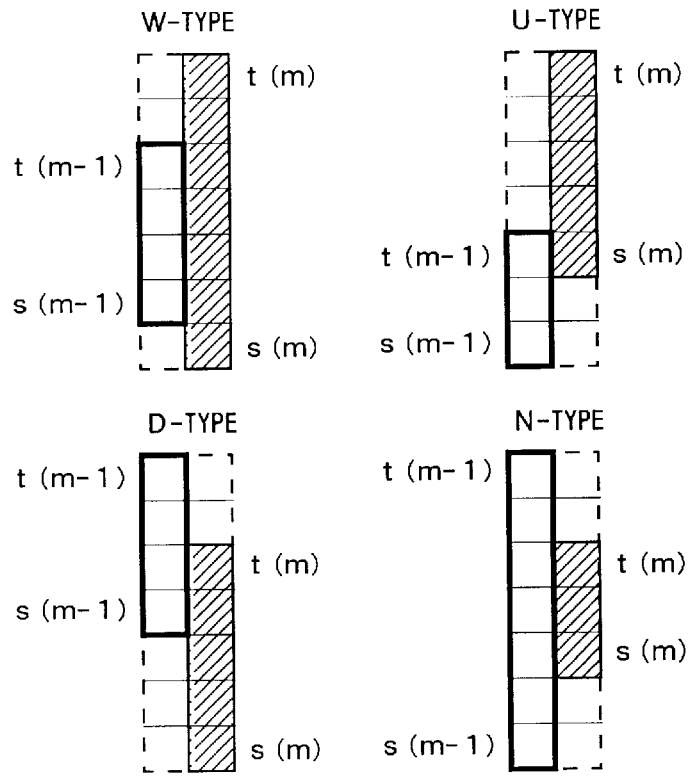
FIG. 18 is a drawing for explaining the nature of the rectilinear convex region.

(a) W-Type: Widen type (upper-left of FIG. 18) for s(m−1)≧s(m), t(m−1)≦t(m)

(b) U-Type: Up type (upper-right of FIG. 18) for s(m−1)≦s(m), t(m−1)≦t(m)

(c) D-Type: Down type (lower-left of FIG. 18) for s(m−1)≧s(m), t(m−1)≧t(m)

(d) N-Type: Narrow type (lower-right of FIG. 18) for s(m−1)≦s(m), t(m−1)≧t(m)

A column of $m=m_1$ belongs to all the change tendencies, and if the equality signs in the above inequalities are valid, the particular column belongs to a plurality of change tendencies at the same time. From the above definition, the section of any column in a rectilinear convex region belongs to any of the above four types.

Further, from the nature of the rectilinear convex region, the change tendency of the left adjacent column of a column having a certain change tendency satisfies the following conditions. That is, (1) The left adjacent column of W-Type is W-Type.

(2) The left adjacent column of U-Type is W-Type or U-Type.

(3) The left adjacent column of D-Type is W-Type or D-Type.

(4) The left adjacent column of N-Type is W-Type or U-Type, or D-Type, or N-Type.

Figure 19:
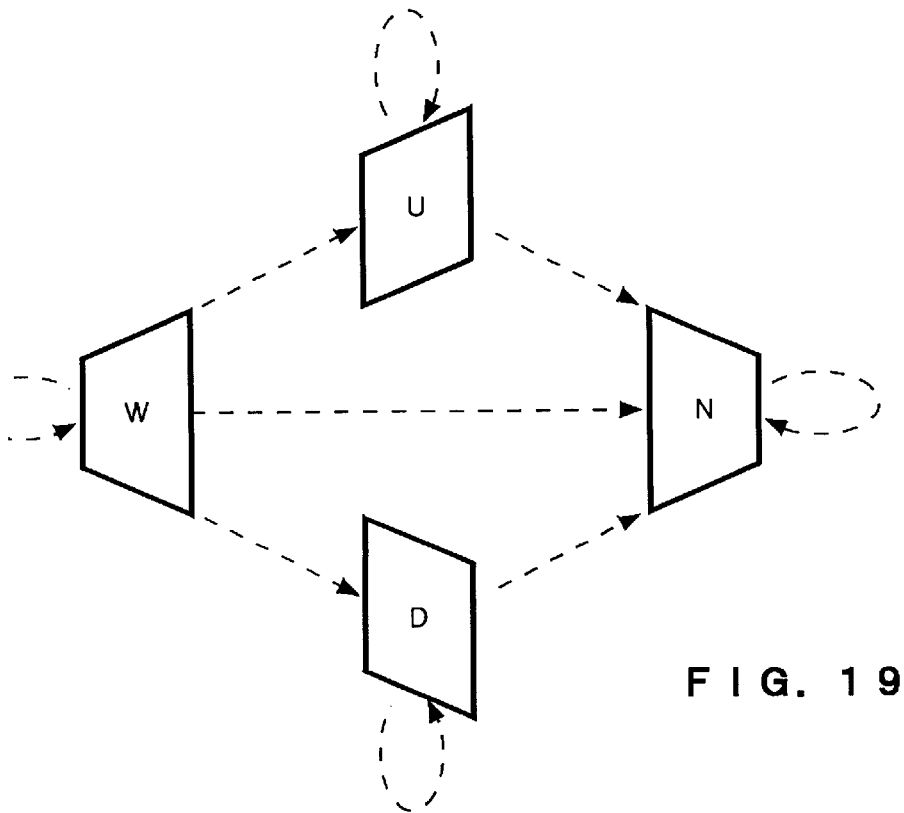
FIG. 19 is a drawing for representing state transition in each column.

Conversely, regions satisfying such conditions are rectilinear convex regions. These conditions are shown in FIG. 19 as a state transition diagram. W, U, D, and N in the figure are W-Type, U-Type, D-Type, and N-Type, respectively, and each tracing of an arrow means transition to the state of one right adjacent column.

All rectilinear convex regions can be classified into the above shown four types by the change tendency of the rightmost column of the region. The four types are generically called X-type (X∈{W, U, D, N}). Similarly to the type of the section of a column, the type of a region may belong to a plurality of types at the same time.

Further, the maximum value of the gains of rectilinear convex regions of the X-type whose right end is the section [s, t] in the m-th column is represented as $f_m^X(s, t)$. And, the largest gain of the four types regions is represented as $f_m(s, t)$. That is, it is Expression 29

$$f_m(s,t) = \max\{f_m^W(s,t), f_m^U(s,t), f_m^D(s,t), f_m^N(s,t)\}$$

These $f_m(s, t)$ are determined for m=0, ... $N_x$−1 (∀(s≦t)), and the largest of them is selected, then it is the maximum value of the gains of the all rectilinear convex regions on the above plane.

To determine the maximum value, a course of sequentially calculating all $f_m(s, t)$ (∀(s≦t)) for m=0 ... $N_x$−1 is taken.

Then, for m=0, that is, $f_0^X(s, t)$ of the first column is calculated. In this case, it is the same for all the types. This is obtained by

Expression 30

$$f_0^X(s, t) = \Gamma_0(s, t)$$

$$\forall X \in \{W, U, D, N\}$$

$$\forall (s \leq t)$$

Then, $f_{m-1}^X(s, t)$ ($\forall (X \in \{W, U, D, N\}, (\forall (s \leq t)))$ is determined. The following gives description for each type.

(a) Widen Type (W-Type)

The maximum value $f_m^W(s, t)$ of the gains of rectilinear convex regions in which the section [s, t] in the m-th column is the rightmost end and the m-th column is W-Type is determined by the following expression.

Expression 31

$$f_m^W(s, t) = \max \begin{cases} \Gamma_m(s, t) & (1) \\ f_m^W(s, t) + \Gamma_m(s, t) & (2) \\ f_m^W(s, t-1) + g(t, m) & (s < t) \quad (3) \\ f_m^W(s+1, t) + g(s, m) & (s < t) \quad (4) \end{cases}$$

To obtain max, comparison is made only for the expressions (1) and (2) of the equation 31 if s=t, and the larger value is used. For other cases, the largest value from all of (1) to (4) is used.

The expression (1) in the equation 31 represents the gain of a region (vertical rectangle of a width 1) consisting only of the section [s, t] of the m-th column. Further, the expression (2) represents the largest gain of the regions in which the m−1-th column is W-Type and its section is [s, t], and the m-th column is the right end at the section [s, t]. This indicates the case as shown in FIG. 20(a). In addition, from the nature of the rectilinear convex region, if the m-th column is W-type, it is determined that the m−1-th column is W-Type.

Further, the expression (3) represents the largest gain of the regions in which the m−1-th column is W-Type and its section [s(m−1), t(m−1)] satisfies s(m−1)≧s, t(m−1)≦t−1, and the section [s, t] of the m-th column is the right end. This means the shape as shown in FIG. 20(b). The upper end of the m−1-th column is not greater than t−1, and the lower end is not smaller than s. The expression (4) represents the largest gain of the regions in which the m−1-th column is W-Type and its section [s(m−1), t(m−1)] satisfies s(m−1)≧s+1, t(m−1)≦t, and the section [s, t] of the m-th column is the right end. This means the shape as shown in FIG. 20(c). The upper end of the m−1-th column is not greater than t, and the lower end is not smaller than S+1. The expressions (2) to (4) take into consideration that the left column adjacent to W-Type cannot be any other type than W-Type.

The above calculation of $f_m^W(s, t)$ is performed for all the sections [s, t] in one column. This calculation follows the algorithm in FIG. 21. As described above, the largest gain is obtained of the regions in which the m-th column is the right end of the region and the change tendency from the m−1-th column is W-Type.

(b) Up Type (U-type)

First, the values of the following expressions are determined.

Expression 32

$$\beta_{m-1}^W(s, t) = \left\{ i \,\middle|\, \max_{i \leq s} f_{m-1}^W(i, t) \right\}$$

Expression 33

$$\beta_{m-1}^U(s, t) = \left\{ i \,\middle|\, \max_{i \leq s} f_{m-1}^U(i, t) \right\}$$

Figures 20, 21, 22:
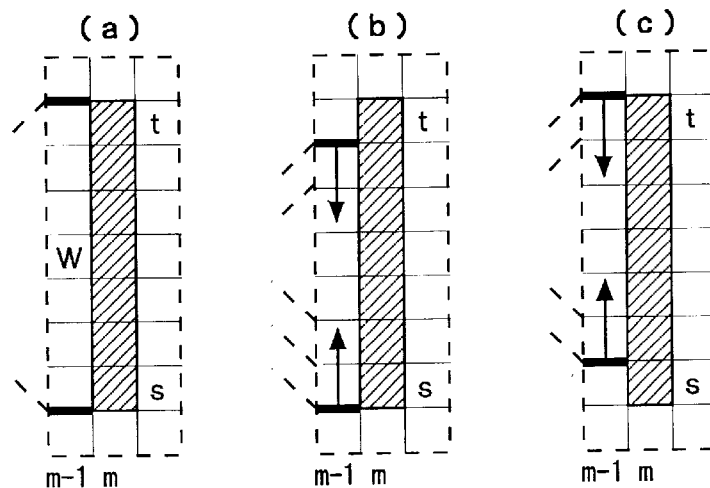
FIG. 20 is a drawing for explaining the relationship between the m-th column and the m−1-th column in W-type. (a) is for explaining an expression (2) in the Expression 31, (b) for explaining an expression (3), (c) for explaining an expression (4).
FIG. 21 is a pseudo-code for explaining the calculation order of $f_m^W(m, t)$.
FIG. 22 is a pseudo-code for explaining an preprocessing algorithm for the calculation of U-type.

This is executed by an algorithm as shown in FIG. 22.

Using the above calculation, the maximum value $f_m^U(s, t)$ of the gains of the rectilinear convex regions in which the section [s, t] of the m-th column is the rightmost end and the m-th column is U-type is obtained from the following expression.

Expression 34

$$f_m^U(s, t) = \max \begin{cases} \Gamma_m(s, t) & (1) \\ f_{m-1}^W(\beta_{m-1}^W(s, t), t) + \Gamma_m(s, t) & (2) \\ f_{m-1}^U(\beta_{m-1}^U(s, t), t) + \Gamma_m(s, t) & (3) \\ f_m^U(s, t-1) + g(t, m) & (s < t) \quad (4) \end{cases}$$

The expressions (1) to (3) are used for comparison if s=t, and the expression (4) is not used in such case.

The expression (1) of the Expression 34 represents the gain of a region (vertical rectangle of a width 1) consisting only of the section [s, t] of the m-th column. Further, the expression (2) represents the largest gain of the regions in which the m−1-th column is W-Type and its section [s(m−1), t(m−1)] satisfies s(m−1)≦s, t(m−1)=t, and the m-th column is the right end at the section [s, t]. This is for the shape shown in FIG. 23(a), and the upper limit of the lower end of the m−1-th column is s.

The expression (3) represents the largest gain of the regions in which the m−1-th column is U-Type and its section [s(m−1), t(m−1)] satisfies s(m−1)≦s, t(m−1)=t, and the m-th column is the right end at the section [s, t]. This is for the shape shown in FIG. 23(b), and the upper limit of the lower end of the m−1-th column is s. The expression (4) represents the largest gain of the regions in which the m−1-th column is W-Type or U-Type and its section [s(m−1), t(m−1)] satisfies s(m−1)≦s, s≦t(m−1)≦t−1, and the m-th column is the right end at the section [s, t]. This is for the shape shown in FIG. 23(c), and the upper limit of the lower end of the m−1-th column is s, and the range of the upper end is not smaller than s and not greater than t−1. The expressions (2) to (4) take into consideration that the left adjacent column to U-Type cannot be any other type than W-Type or U-Type.

The above calculation of $f_m^U(s, t)$ is performed for all the sections [s, t] in one column. This calculation follows the algorithm shown in FIG. 24. Thus, the largest gain is obtained of the regions in which the m-th column is the right end of the region and the change tendency thereof is U-Type.

(c) Down Type (D-Type)

First, the values of the following expressions are calculated.

Expression 35

$$\tau_{m-1}^W(s, t) = \left\{ i \,\middle|\, \max_{i \geq t} f_{m-1}^W(s, i) \right\}$$

Expression 36

$$\tau_{m-1}^D(s, t) = \left\{ i \,\middle|\, \max_{i \geq t} f_{m-1}^D(s, i) \right\}$$

These calculations are carried out by the algorithm shown in FIG. 25. The expressions (1) to (3) are used for comparison if s=t, and the expression (4) is not used in such case.

Using the above calculations, the maximum value $f_m^D(s, t)$ of the gains of the rectilinear convex regions in which the section [s, t] of the m-th column is the rightmost end and the m-th column is D-Type is determined from the following expression.

Expression 37

$$f_m^D(s, t) = \max \begin{cases} \Gamma_m(s, t) & (1) \\ f_{m-1}^W(s, \tau_{m-1}^W(s, t)) + \Gamma_m(s, t) & (2) \\ f_{m-1}^D(s, \tau_{m-1}^D(s, t)) + \Gamma_m(s, t) & (3) \\ f_m^D(s+1, t) + g(s, m) & (s < t) \quad (4) \end{cases}$$

The expression (1) of the Expression 37 represents the gain of a region (vertical rectangle of a width 1) consisting only of the section [s, t] of the m-th column. Further, the expression (2) represents the largest gain of the regions in which the m−1-th column is W-Type and its section [s(m−1), t(m−1)] satisfies s(m−1)=s, t(m−1)≧t, and the m-th column is the right end at the section [s, t]. This is for the shape shown in FIG. 26(a), and the lower limit of the upper end of the m−1-th column is t.

The expression (3) represents the largest gain of the regions in which the m−1-th column is D-Type and its section [s(m−1), t(m−1)] satisfies s(m−1)=s and t(m−1)≧t, and the m-th column is the right end at the section [s, t]. This is for the shape shown in FIG. 26(b), and the lower limit of the upper end of the m−1-th column is t. The expression (4) represents the largest gain of the regions in which the m−1-th column is W-Type or D-Type and its section [s(m−1), t(m−1)] satisfies s+1≦s(m−1)≦t and t(m−1)≧t, and the m-th column is the right end at the section [s, t]. This is for the shape shown in FIG. 26(c), and the lower limit of the upper end of the m−1-th column is t, and the range of the lower end is not smaller than s+1 and not greater than t. The expressions (2) to (4) take into consideration that the left adjacent column to D-Type cannot be any other type than W-Type or D-Type.

The above calculation of $f_m^D(s, t)$ is performed for all the sections [s, t] in one column. This calculation follows the algorithm in FIG. 27. Thus, the largest gain is obtained of the regions in which the m-th column is the right end of the region and the change tendency thereof is D-Type.

(d) Narrow Type (N-Type)

The following expression gives the maximum value $f_m^N(s, t)$ of the gains of the rectilinear convex regions in which the section [s, t] of the m-th column is the rightmost end and the m-th column is N-Type.

Expression 38

$$f_m^N(s, t) = \max \begin{cases} \Gamma_m(s, t) & (1) \\ f_{m-1}^W(s, t) + \Gamma_m(s, t) & (2) \\ f_{m-1}^U(s, t) + \Gamma_m(s, t) & (3) \\ f_{m-1}^D(s, t) + \Gamma_m(s, t) & (4) \\ f_m^N(s, t+1) + \Gamma_m(s, t) & (5) \\ f_m^N(s, t+1) - g(t+1, m) & (t < N_y - 1) \quad (6) \\ f_m^N(s-1, t) - g(s-1, m) & (s > 0) \quad (7) \end{cases}$$

When max is determined, each expression is used only if the condition at the end of the expression is satisfied. That is, the expression (6) is compared only when $t > N_y - 1$ is satisfied, and the expression (7) is used for comparison only if s>0 is satisfied.

Figures 28, 29:
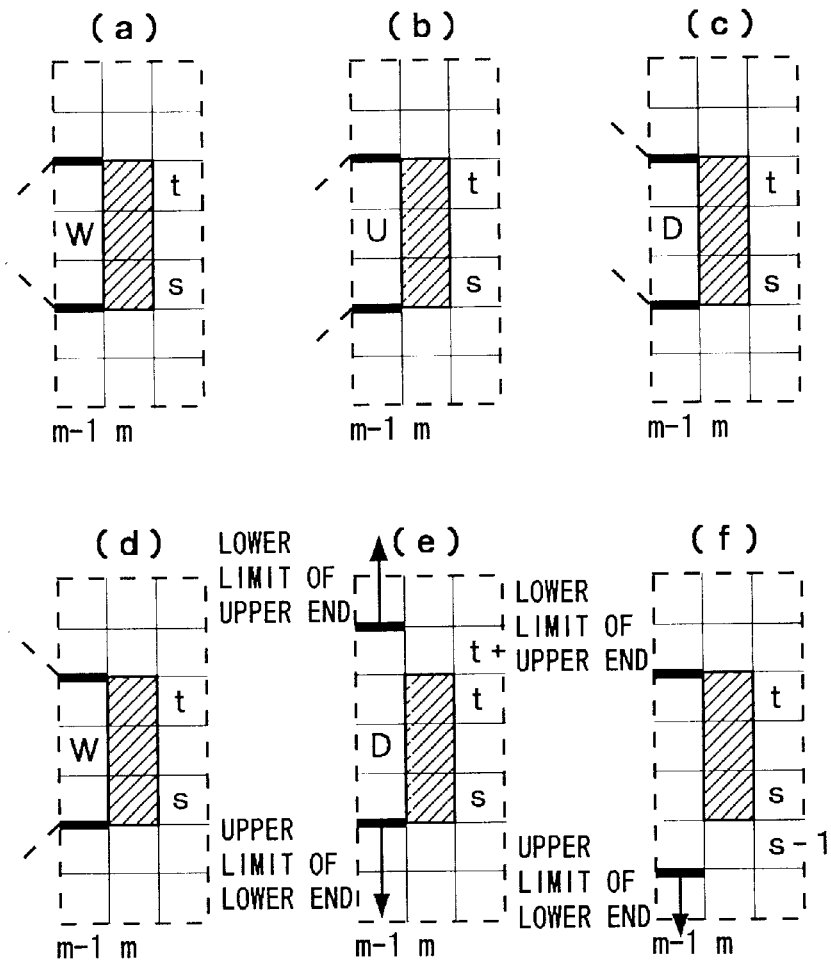
FIG. 28 is a drawing for explaining the relationship between the m-th column and the m−1-th column in N-type. (a) is for explaining an expression (2) in the Expression 38, (b) for explaining an expression (3), (c) for explaining an expression (4), (d) for explaining an expression (5), (e) for explaining an expression (6), (f) for explaining an expression (7).
FIG. 29 is a pseudo-code for explaining the calculation order of $f_m^N(m, t)$.

The expression (1) of the Expression 38 represents the gain of a region (vertical rectangle of a width 1) consisting only of the section [s, t] of the m-th column. The expression (2) represents the largest gain of the regions in which the m−1-th column is W-Type and its section is [s, t], and the m-th column is the right end at the section [s, t]. This is for the shape shown in FIG. 28(a). The expression (3) represents the largest gain of the regions in which the section [s, t] of the m−1-th column is U-Type, and the m-th column is the right end at the section [s, t]. This is for the shape shown in FIG. 28(b). The expression (4) represents the largest gain of the regions in which the section [s, t] of the m−1-th column is D-Type, and the m-th column is the right end at the section [s, t]. This is for the shape shown in FIG. 28(c). The expression (5) represents the largest gain of the regions in which the section [s, t] of the m−1-th column is N-Type and its section is [s, t], and the m-th column is the right end at the section [s, t]. This is for the shape shown in FIG. 28(d).

The expression (6) represents the largest gain of the regions in which the m−1-th column is W-Type, U-Type, D-Type, or N-Type and its section [s(m−1), t(m−1)] satisfies s(m−1)≦s and t(m−1)≧t+1, and the m-th column is the right end at the section [s, t]. This is for the shape shown in FIG. 28(e), and the lower limit of the upper end of the m−1-th column is t+1, and the upper limit of the lower end is s. The expression (7) represents the largest gain of the regions in which the m−1-th column is W-Type, U-Type, D-Type, or N-Type and its section [s(m−1), t(m−1)] satisfies s(m−1)≦s−1 and t(m−1)≧t, and the m-th column is the right end at the section [s, t]. This is for the shape shown in FIG. 28(f), and the lower limit of the upper end of the m−1-th column is t, and the upper limit of the lower end is s−1.

The above calculation of $f_m^N(s, t)$ is performed for all the sections [s, t] in one column. This calculation follows the algorithm in FIG. 29. Thus, the largest gain is obtained of the regions in which the section [s, t] of the m-th column is the right end of the region and the change tendency thereof is N-Type.

By the above described calculations (a) to (d), the largest gain of the regions in which the each [s, t] of each column is the right end can be calculated, but the "region" itself needs to be stored at the same time. This is because the data included in the obtained rectilinear convex region is taken out in the later output step.

If there are a plurality of regions having the same maximum value, the one which was found first is treated as the solution. Further, the regions are expressed as

[s(m₁), t(m₁)], . . . [s(m_r), t(m_r)], which shows that vertical sections are laterally arranged. Since one column includes $N_y$ rows, the total number of sections [s, t] (s≦t) is $N_y(N_y+1)/2$. Each section [s, t] is made to correspond to one integer p in a one-to-one relationship.

For instance, by the following function h(s, t), a section [s, t] can be made to correspond to one integer p=h(s, t). That is, it is Expression 39

$$h(s, t) = S + \frac{t(t+1)}{2}$$

Conversely, from the integer p (0≦p≦$N_y(N_y+1)/2$) representing a section, the section [s, t] is determined as follows.

Expression 40

$$t = \left\lfloor \frac{-1 + \sqrt{1+8p}}{2} \right\rfloor$$

Expression 41

$$S = P - \frac{t(t+1)}{2}$$

However, such calculation is not used for determining which region has the largest gain. Hereinafter, [s, t] is treated as the same as one integer. Further, the above Expression 39 is merely an example, and there is no problem if other functions are used.

Then, arrays in which regions are stored are prepared. They are integer-type two-dimensional arrays of $N_x \times N_y(N_y+1)/2$, which are prepared one for each of the W, U, D, and N-Types. This element is represented by $H^X$(m, [s, t]) (0≦m≦$N_x$−1, 0≦[s, t]≦$N_y$ ($N_y$+1)/2, X∈{W, U, D, N}).

In this element $H^X$(m, [s, t]), the section [x, y] in the m−1-th column of a region whose gain is $f_m^X$(s, t), and a numeric value representing the change tendency Y of the m−1-th column from the m−2-th column are stored. Hereinafter, it is represented by $H^X$(m, [s, t])=Y:[x, y]. For instance, this $H^X$(m, [s, t]) is expressed by 32 bits of integer type, and the portion of Y is expressed by two upper bits, and the remaining lower bits are used to represent [x, y] (refer to FIG. 30).

However, if the m-th column is the leftmost column, a value representing the left end of the region is stored in the lower bits to show that the m-th column does not connect with the m−1-th column. For instance, in an example in which a section is expressed by the above Expression 41, a value equal to or greater than $N_y(N_y+1)/2$ is placed in the lower bits, or the 29-th bit is used as a flag representing the left end of the region.

Figure 31:
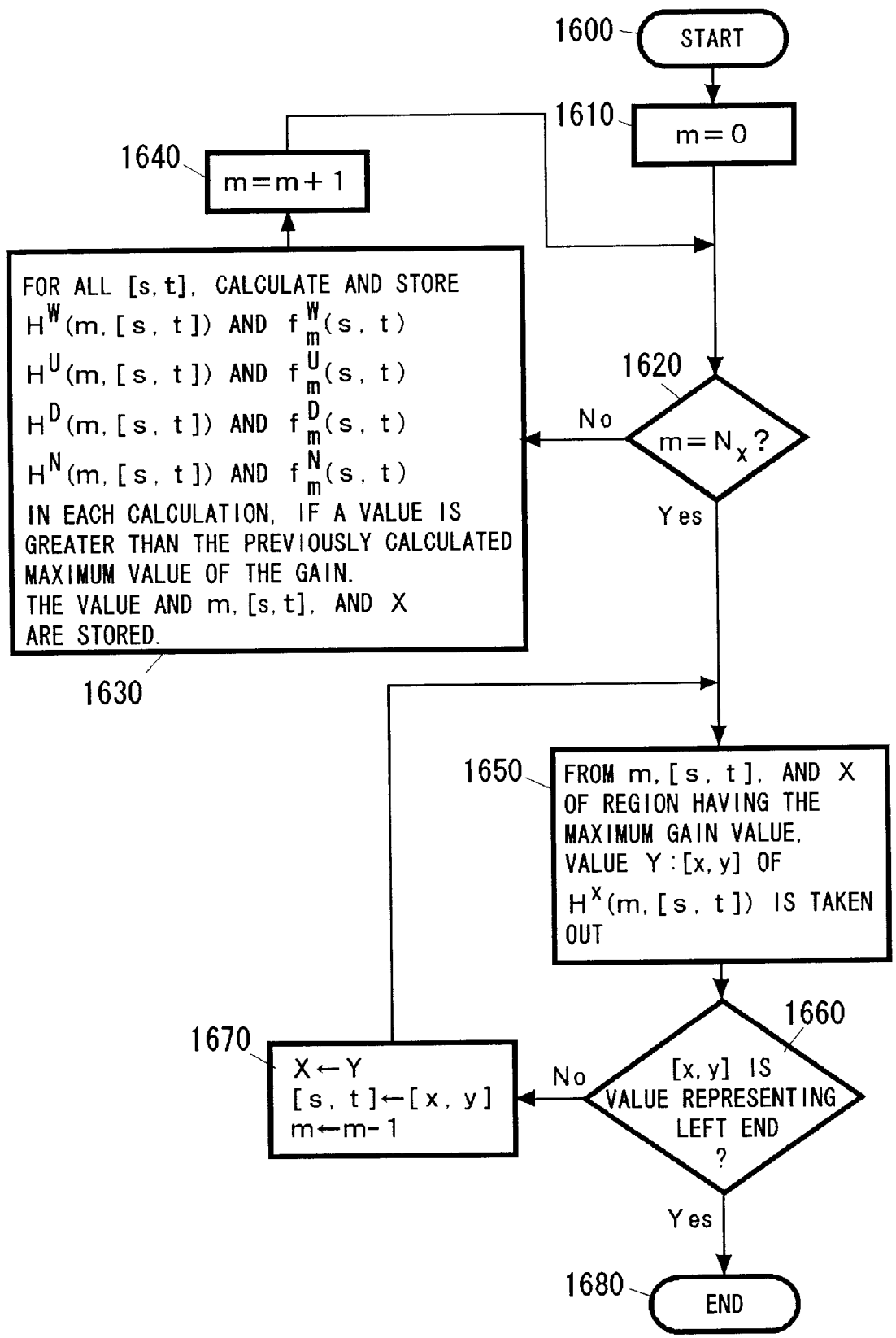
FIG. 31 is a flowchart for segmenting a rectilinear convex region.

Now, the process for finally determining a rectilinear convex region having the largest gain is described using FIG. 31. The process started at step 1600 initializes m by m=0 (step 1610). Then, it is determined whether m=$N_x$ (step 1620). This is to determine whether m has reached $N_x$ and the following calculation has been completed for all the columns. If the calculation has not been completed for all the columns m, $H^W$(m, [s, t]) and $f_m^W$(s, t), $H^U$(m, [s, t]) and $f_m^U$(s, t), $H^D$(m, [s, t]) and $f_m^D$(s, t), and $H^N$(m, [s, t]) and $f_m^N$(s, t) are calculated for all [s, t], and the result is stored. The sequence of this calculation is arbitrary. Then, if, during each calculation, a value greater than the maximum value of the previously calculated gains is calculated, that value and its m, [s, t], and X are stored (step 1630).

The calculation of $H^W$(m, [s, t]) and $f_m^W$(s, t) can be provided by carrying out the calculation of the previously shown Expression 31. Accordingly, $H^W$(m, [s, t]) becomes a value representing the left end of the region if the expression (1) of the Expression 31 is maximum, W:[s, t] if the expression (2) is maximum, $H^W$(m, [s, t−1]) if the expression (3) is maximum, and $H^W$(m, [s+1, t]) if the expression (4) is maximum. As described above, if only $H^W$(m, [s, t]) is considered, the preceding m−1-th column is always W-Type, and thus it is not necessary to store the change tendency of the m−1-th column from the m−2-th column.

Further, the calculation of $H^U$(m, [s, t]) and $f_m^U$(s, t) can be provided by carrying out the calculation of the previously shown Expression 34. Accordingly, in $H^U$(m, [s, t]), a value representing the left end of the region is stored if the expression (1) of the Expression 34 is maximum, W:[$\beta_{m-1}^W$(s, t), t] if the expression (2) is maximum, U:[$\beta_{m-1}^U$(s, t), t] if the expression (3) is maximum, and $H^U$(m, [s, t−1]) if the expression (4) is maximum.

The calculation of $H^D$(m, [s, t]) and $f_m^D$(s, t) can be provided by carrying out the calculation of the previously shown Expression 37. Accordingly, in $H^D$(m, [s, t]), a value representing the left end of the region is stored if the expression (1) of the Expression 37 is maximum, W:[s, $\tau_{m-1}^W$(s, t)] if the expression (2) is maximum, D:[s, $\tau_{m-1}^D$(s, t)] if the expression (3) is maximum, and $H^D$(m, [s+1, t]) if the expression (4) is maximum.

Finally, the calculation of $H^N$(m, [s, t]) and $f_m^N$(s, t) can be provided by carrying out the calculation of the previously shown Expression 38. Accordingly, in $H^N$(m, [s, t]) a value representing the left end of the region is stored if the expression (1) of the Expression 38 is maximum, W:[s, t] if the expression (2) is maximum, U:[s, t] if the expression (3) is maximum, and D:[s, t] if the expression (4) is maximum, N:[s, t] if the expression (5) is maximum, $H^N$(m, [s, t+1]) if the expression (6) is maximum, and $H^N$(m, [s−1, t]) if the expression (7) is maximum.

As seen from the foregoing, it is not needed to store all $f_m^X$(s, t). When the calculation of the m-th column is carried out, only the calculation results of the m-th column and the m−1-th column are used. Accordingly, only a storage capacity for two columns is required for each of the W, U, D, and N-Types. However, all $f_m^X$(s, t) may be stored if there is a sufficient storage.

When step 1630 of FIG. 31 ends, m is incremented by one (step 1640), and the process returns to step 1620. Then, this process is executed for all the columns. If executed for all the columns, from m, [s, t], and X regarding the region having the largest gain value for all the columns, $H^X$(m, [s, t]) is referenced and its value Y:[x, y] is taken out (step 1650). Up to this point, the m-th column that is the rightmost column, the section [s, t] of that column, and the m−1-th column and its section [x, y] have been found.

Then, since the region may be the left end at the m−1-th column, it is determined whether [x, y] is a value representing the left end (step 1660). If it is the left end, the process terminates at this point (step 1680). If it is not the left end, Y is substituted into X, [x, y] into [s, t], and m−1 into m(step 1670), and then the process returns to step 1650. By repeating this process in this way until [x, y] becomes a value representing the left end, the section of each column of the rectilinear convex region having the largest gain value can be obtained.

The interclass variance may be calculated after the entire region is determined, or during the calculation of the region.

By the algorithms described above, a region R with a desired shape can be segmented from a plane. In addition, a rule R by the region R can be constructed. However, the above explanation is concerned about only upper convex hull on the plane shown in FIG. 7. Therefore, a region on the lower convex hull is calculated by minimizing the expressions shown in Expression 1 and etc. instead of maximizing.

The processing of the present invention has been explained. This processing may be realized by a computer program. For example, the processing can be included in a program that can be executed by an ordinary computer system shown in FIG. 32. The processing program is stored on an HDD 1050, and is loaded into a main memory 1020, and is then executed by a CPU 1010. A database is also stored on the HDD 1050, and the processing program accesses the database. The plane in FIG. 6, the region R extracted therefrom, and the regression tree are provided for a user by a display device 1060. The user uses an input device 1070 to enter a tree generation command or a data output command. The input device 1070 can be a keyboard, a mouse, a pointing device or a digitizer. The output result can be stored on a floppy disk in an FDD 1030, which is an auxiliary storage device, or new data can be read from the FDD 1030. Additional data can be input by using a CD-ROM drive 1040.

A computer program that realizes the processing of the present invention can be stored on a storage medium, such as a floppy disk or a CD-ROM, and be transported. In this case, a data extraction portion of an ordinary database search program, or a program for displaying data on the display device 1060, may already be stored on the HDD 1050. It is, therefore, normal for the other portions to be distributed on one of the above mentioned storage mediums. A communication device (not shown) may be connected to a bus 1080, so that a database at a remote location can be accessed for processing or so that a result obtained by processing can be transmitted to a remote location.

A special device for executing the processing of the present invention may be provided. An example device is shown in FIG. 33. A tree generation module 400 in this device is connected to a database 402 and a hand probe controller 404. The hand probe controller 404 is connected to a plane formation module 406 and region segmentation modules 1 to 3 (408, 410 and 412). The plane formation module 406 is connected to a region segmentation modules 1 to 3.

The tree generation module 400 performs the general process required for generation of a regression tree. The tree generation module 400 extracts necessary data from the database 402 and outputs it to the hand probe controller 404. The hand probe controller 404 sets θ as required for hand probing. Furthermore, the hand probe controller 404 receives a shape instruction from a user designating a desired shape to be extracted. In this embodiment, an x monotone region (processed by the region segmentation module 1), a base monotone region (processed by the region segmentation module 2), or a rectilinear convex region (processed by the region segmentation module 3) can be selected. The hand probe controller 404 designates a region segmentation module to be activated. The plane formation module 406 employs data from the hand probe controller 404 to form the plane in FIG. 6, and outputs the plane to the individual region segmentation modules.

The above arrangement is merely an example, and the provision of the modules shown in FIG. 33 is not always necessary. Modules for performing the above mentioned processes can be provided separately or as integral units, as needed.

ADVANTAGES OF THE INVENTION

Since two-dimensional region segmentation is employed as a splitting rule for generating a regression tree, a more preferable tree can be generated.

It is also possible to provide a regression tree generation method whereby the separation/prediction accuracy of the objective numeric attribute relative to data can be enhanced by a small splitting count.

Further, a method for more rapidly finding a more desirable rule for splitting can be provided.

What is claimed is:

1. A method for generating a regression tree for objective numeric attribute of data in a database, the method comprising:

forming a plane having N×M buckets each bucket corresponding to one objective numeric attribute value, said plane having two axes respectively corresponding to two predictive numeric attributes of data included in said database and belonging to one node of said regression tree;

storing the number of tuples of data in each bucket and the sum of said objective numeric attribute values of data in each bucket so as to correspond to each bucket in said plane;

segmenting a bucket region of said plane that minimizes the mean squared error of said objective numeric attribute values from the plane;

generating a first node for data inside of the segmented bucket region and a second node for data outside of the segmented bucket region; and producing said regression tree from said first and second nodes.

2. The method according to claim 1, wherein said storing and said segmenting are performed for a plurality of combinations of two predicative numeric attributes, and the method further includes selecting a bucket region which has the minimum mean-squared error among a plurality of segmented bucket regions.

3. The method according to claim 1, wherein said segmenting a bucket region comprises: segmenting a bucket region whose parts overlapping with lines, which are parallel with one axis of said two axes, are continuous or empty.

4. The method according to claim 1, wherein said segmenting a bucket region comprises:

segmenting a bucket region whose parts overlapping with first lines, which are parallel with one axis of said two axes, are continuous or empty and whose parts overlapping with second lines, which are parallel with another axis of said two axes, are continuous or empty.

5. The method according to claim 1, wherein said segmenting a bucket region comprises:

segmenting a bucket region whose parts overlapping with lines, which are parallel with column axis of said two axes, are continuous or empty and whose number of maximum or minimum rows overlapping with a line, which is parallel with a row axis of said two axes, is fixed among columns within the region.

6. A method for generating a regression tree for an objective numeric attribute of data in a database, the method comprising:

forming a plane having N×M buckets, each bucket corresponding to an objective numeric attributes value, said plane having two axes respectively corresponding to two predicative numeric attributes of data included in said database and belonging to one node of said regression tree;

storing the number u(i,j) of data in each bucket (i,j) and the sum v(i,j) of said objective numeric attribute values of data in each bucket (i,j) so as to correspond to each bucket in said plane;

generating a first node for data inside of the segmented bucket region and a second node for data outside of the segmented bucket region; and producing said tree from said first node and said second node.

7. The method according to claim 6, wherein said segmenting a bucket region comprises:

inputting a condition θ; and segmenting a bucket region R from said plane, said region R maximizes $$\sum_{(i,j)\in R} g(i, j) = \sum_{(i,j)\in R} (v(i, j) - \theta u(i, j))$$

8. An apparatus for generating a regression tree for an objective numeric attribute of data in a database, said apparatus comprising:

a plane forming module for storing an N×M array of buckets, each bucket storing the number of tuples of data in each respective bucket and the sum of said objective numeric attribute values of data in each respective bucket, said plane having two axes respectively corresponding to two predicative numeric attributes of data included in said database and belonging to one node of said regression tree, each bucket corresponding to an objective numeric attribute value;

a segmenting module for segmenting a bucket region that minimizes the mean-squared error of said objective numeric attribute values;

a module for generating nodes for data inside of the segmented bucket region and data outside of the segmented bucket region; and a module for producing the regression tree from the generated nodes.

9. The apparatus according to claim 8, wherein said plane forming module and said segmenting module is operable for a plurality of combinations of two predicative numeric attributes, and said apparatus further comprises a module for selecting a bucket region which has the minimum mean-squared error among a plurality of segmented bucket regions.

10. An apparatus for generating a regression tree for an objective numeric attribute of data in a database, said apparatus comprising:

a plane forming module for storing an N×M array of buckets, each bucket storing the number u(i,j) of data in each respective bucket (i,j) and the sum v(i,j) of said objective numeric attribute values of data in each respective bucket (i,j), said plane having two axes respectively corresponding to two predicative numeric attributes of data included in said database and belonging to one node of said regression tree;

a segmenting module for segmenting a bucket region that maximizes an interclass variance from the plane;

a module for generating a first node for data inside of the segmented bucket region and a second node for data outside of the segmented bucket region; and a module for producing the regression tree from the first and second nodes.

11. The apparatus according to claim 10, wherein said segmenting module comprises:

means for inputting a condition θ; and means for segmenting a bucket region R from said plane, said region R maximizes $$\sum_{(i,j)\in R} g(i, j) = \sum_{(i,j)\in R} (v(i, j) - \theta u(i, j)).$$

12. A storage medium storing a program for generating a regression tree for an objective numeric attribute of data in a database, said program causing a computer to execute functions comprising:

forming a plane having N×M buckets, each bucket corresponding to an objective numeric attribute value, said plane having two axes respectively corresponding to two predicative numeric attributes of data included in said database and belonging to one node of said regression tree;

storing the number of data in each bucket and the sum of said objective numeric attribute values of data in each bucket so as to correspond to each bucket in a plane;

segmenting a bucket region that minimizes the mean-squared error of values of said objective numeric attribute from the plane;

generating a first node for data inside of the segmented bucket region and a second node for data outside of the segmented bucket region; and producing said regression tree from said first node and said second node.

13. The storage medium according to claim 12, wherein said storing and said segmenting are performed for a plurality of combinations of two predicative numeric attributes and said program further includes selecting a bucket region which has the minimum mean-squared error among a plurality of segmented bucket regions.

14. The storage medium according to claim 12, wherein said segmenting a bucket region comprises segmenting a bucket region whose parts overlapping with lines, which are parallel with one axis of said two axes, are continuous or empty.

15. The storage medium according to claim 12, wherein said segmenting a bucket region comprises segmenting a bucket region whose parts overlapping with first lines, which are parallel with one axis of said two axes, are continuous or empty and whose parts overlapping with second lines, which are parallel with another axis of said two axes, are continuous or empty.

16. The storage medium according to claim 12, wherein said segmenting a bucket region comprises segmenting a bucket region whose parts overlapping with lines, which are parallel with column axis of said two axes, are continuous or empty and whose number of maximum or minimum rows overlapping with a line, which is parallel with a row axis of said two axes, is fixed among columns within the region.

17. A storage medium storing a program for generating a regression tree for an objective numeric attribute of data in a database, said program causing a computer to execute functions comprising:

forming a plane having N×M buckets, each bucket corresponding to an objective numeric attribute value, said plane having two axes respectively corresponding to two predicative numeric attributes of data included in said database and belonging to one node of said regression tree;

storing the number u(i,j) of data in each bucket (i,j) and the sum v(i,j) of said objective numeric attribute values of data in each bucket (i,j) so as to correspond to each bucket in said plane;

segmenting a bucket region that maximizes an interclass variance from the plane;

generating a first node for data inside of the segmented bucket region and a second node for data outside of the segmented bucket region; and producing said tree from said first node and said second node.

18. The storage medium according to claim 17, wherein said segmenting of said bucket region comprises:

inputting a condition θ; and segmenting a bucket region R from said plane, said region R maximizes $$\sum_{(i,j) \in R} g(i, j) = \sum_{(i,j) \in R} (v(i, j) - \theta u(i, j)).$$

* * * * *